US012744130B2

(12) United States Patent
Bin Mustapha et al.

(10) Patent No.: US 12,744,130 B2
(45) Date of Patent: Sep. 22, 2026

(54) NUCLEAR REACTOR AND METHOD FOR CONTROL THEREOF

(71) Applicants: Azrudi Bin Mustapha, Cyberjaya (MY); Keith Henry Ardron, Gloucester (GB)

(72) Inventors: Azrudi Bin Mustapha, Cyberjaya (MY); Keith Henry Ardron, Gloucester (GB)

( * ) Notice: Subject to any disclaimer, the term of this patent is extended or adjusted under 35 U.S.C. 154(b) by 398 days.

(21) Appl. No.: 18/294,810

(22) PCT Filed: Aug. 2, 2022

(86) PCT No.: PCT/EP2022/071630
§ 371 (c)(1),
(2) Date: Feb. 2, 2024

(87) PCT Pub. No.: WO2023/012140
PCT Pub. Date: Feb. 9, 2023

(65) Prior Publication Data

US 2024/0339230 A1 Oct. 10, 2024

(30) Foreign Application Priority Data

Aug. 3, 2021 (EP) .................................... 21189257

(51) Int. Cl.
*G21C 1/14* (2006.01)
*G21C 15/26* (2006.01)
*G21C 7/22* (2006.01)

(52) U.S. Cl.
CPC ............... *G21C 1/14* (2013.01); *G21C 15/26* (2013.01); *G21C 7/22* (2013.01)

(58) Field of Classification Search
CPC ............. G21C 1/14; G21C 15/26; G21C 7/22
(Continued)

(56) References Cited

U.S. PATENT DOCUMENTS

| | | | | |
|---|---|---|---|---|
| 3,393,127 | A | 7/1968 | Detman et al. | |
| 2012/0307956 | A1* | 12/2012 | Singh .................... | G21C 15/12 376/298 |

(Continued)

FOREIGN PATENT DOCUMENTS

| | | | |
|---|---|---|---|
| JP | S6239792 | A | 2/1987 |

OTHER PUBLICATIONS

PCT, International Search Report and Written Opinion, issued for the corresponding international patent application No. PCT/EP2022/071630, mailed Nov. 21, 2022, 9 pages.

*Primary Examiner* — Jack W Keith
*Assistant Examiner* — Daniel Wasil
(74) *Attorney, Agent, or Firm* — LUCAS & MERCANTI, LLP

(57) ABSTRACT

A reactor comprises a reactor vessel having therein a riser tube and a below-ground core. An outer annulus surrounds the vessel, and forms a downcomer. The reactor can produce a primary coolant flow rate above 10,000 kg/s with a pressure within a range of 6-15 bars. A steam drum is connected to the riser tube, and located at ground level with a pressure of 1-10 bars. A borated water storage tank is connected to the vessel. An injection system can cause the borated water to be injected into the vessel. The riser tube converts core-heated water to steam, which can be delivered to steam turbines that can generate power at a pressure of 1-10 bars. The conversion creates a difference in a primary coolant density that achieves a density-driven natural circulation of the primary coolant in the riser tube, the downcomer, the steam drum, and the core.

13 Claims, 7 Drawing Sheets

(58) Field of Classification Search
USPC ................ 376/273, 282, 352, 400, 402, 408
See application file for complete search history.

(56) References Cited

U.S. PATENT DOCUMENTS

| | | | | |
|---|---|---|---|---|
| 2013/0182813 | A1* | 7/2013 | Bingham ............... | G21C 15/26<br>376/373 |
| 2015/0255181 | A1* | 9/2015 | Singh ..................... | G21C 15/26<br>376/402 |
| 2024/0266083 | A1* | 8/2024 | Singh ..................... | G21C 15/26 |

* cited by examiner

NUCLEAR REACTOR AND METHOD FOR CONTROL THEREOF

CROSS REFERENCE TO RELATED APPLICATIONS

This Application is a 371 of PCT/EP2022/071630 filed on Aug. 2, 2022, which claims priority of European Patent Application No. 21189257.5 filed Aug. 3, 2021, the contents of each of which are incorporated herein by reference.

TECHNICAL FIELD

The present invention is directed, in general, to the field of nuclear reactors. In particular, the invention relates to a low pressure water reactor (LPWR) and to a method for controlling a LPWR.

BACKGROUND OF THE INVENTION

Since the advent of electricity as a source of energy, mankind has benefitted from significant growth in quality of life. Often recognized as a basic need, alongside food and water, the access to electricity has been found to directly correlate with economic growth. World energy demand is projected to grow at an annual rate of 2.5% from 2011 to 2035 [1]. Fossil fuels, making up around 87% of the world energy mix, are expected to deplete in the next 80 years, but if the whole world reaches the US standards of living then such a lifestyle could only be supported until 2035 [2].

The most common method of producing electricity today is from the conversion of the energy stored in fossil fuels into electrical energy. However, converting fossil fuels into usable electricity may be controversial due to factors such as the limited availability of natural resources, harmful emissions and national security concerns due to the dependence on foreign nations for fossil fuel resources. The production of electricity from renewable resources, on the other hand, faces challenges in the form of economies of scale, technology maturity and resource reliability/availability in providing a viable alternative to fossil fuel generation, not to mention the political controversies involved in the building of large dams in the case of hydroelectric power plants. Also, large lakes or rivers that are able to provide the energy required by hydroelectric power plants are not widely available. Wind energy has become a strong contender in the energy mix, with the potential of displacing many baseload plants when measured in units of energy generated (kWh) per year: however the intermittency of natural wind forces makes this technology unreliable to provide large-scale on-demand electricity (KW) unless it is paired with energy storage solutions such as battery banks or pumped hydro systems which may be unaffordable. The alternative is the use of nuclear power plants for electricity generation, but this faces similar political and environmental challenges to renewable power projects, as well as raising concerns about accidents and waste disposal. However, nuclear power plants have the well-known advantage of easy fuel access with the availability of high energy-density fissile fuel materials allowing reliable and continuous operation. Like renewable generation, nuclear power plants also have the advantage of returning no greenhouse emissions or toxic industrial waste into the biosphere.

A nuclear power plant produces heat by energy release from a fissile material like uranium or plutonium by nuclear fission in a controlled chain reaction. This heat is normally transferred to a reactor coolant which either becomes the working fluid or transfers the heat to a secondary working fluid. The working fluid drives turbine-generator blades which generate electrical energy.

Nuclear power plants rely on complex modern technologies, which result in safety concerns, as accidents may occur due to equipment malfunctions that result in the exposure of the public to ionizing radiation that can lead to fatalities, or large-scale contamination of land. Indeed, nuclear power technology is the only electricity generating technology that creates a risk of causing severe environmental harm over large areas of land and even across international borders. Safety concerns associated with these risks and the complexity of nuclear technology may sway public opinion, which negatively impacts decision making in modern democracies.

Reactor designers and regulators have postulated a number of events that could lead to accidents in nuclear power plants. For water cooled reactors in particular, the potential consequences of an accidental loss of coolant from a nuclear reactor, known as a LOCA, may result in core meltdown and release of radioactive materials [3][4]. The dependence of most nuclear power technologies on the availability of electricity to drive electrical pumps and controls is also a concern, as evidenced by the accident at the Fukushima plant in Japan in 2011 when flooding of a reactor site disabled all electrical power sources, leading to core meltdown in three reactors. The reliance on highly skilled personnel to operate a plant's safety systems is another potential drawback, leading to a vulnerability to human error as occurred in the 1979 accident at the Three Mile Island Plant in the USA.

To address the safety concerns discussed above, reactor designers have proposed improved reactor design concepts that allow for greater levels of safety and walk-away reliability. These new designs feature advances in safety and reliability, aimed at rebuilding public confidence in nuclear energy while assuring investment protection for nuclear power plant owners by providing competitive life-cycle costs and reduced financial risks. New reactor technologies can be classified into two broad categories, as proposed by Kessides [5]: 'evolutionary designs' known as Generation 3 and 3+ reactors; and 'revolutionary designs', referred to as Generation 4 reactors.

Generation 3/3+ designs are based on evolutionary improvements to existing Generation 2 reactors, placing emphasis on maintaining proven design features to minimize engineering risks and making changes incrementally across to the next iteration [6]. These designs are claimed to have several advantages over previous Generation 2 designs, among them are:

- Finance/Project Management: expedited licensing, shorter construction times, lower capital costs and reduced vulnerability to operational upsets.
- Higher availability for the utilities in terms of fewer shutdowns, and longer operating lifetimes typically of 60 years of more.
- Higher fuel efficiency achieved by increased burn-up of fissile isotopes, greater use of burnable absorbers and greater thermal efficiency.
- Reduced probability of core meltdown: a reduction of typically an order of magnitude lower core damage frequency (CDF) relative to existing Gen 2 plants is claimed.
- Increased resistance to structural damage from aircraft impacts or earthquakes.

However, the Generation 3/3+ reactors that have been built within the past two decades have been plagued by a number of problems, most notably a significant rise in projected capital costs and lengthy project delays. Two of the European Pressurized Reactor (EPR) designs currently being built (at Olkiluoto in Finland and Flamanville in France) are facing cost overruns and the expected project completed dates have been pushed back by many years. EPR units being constructed in China have also been significantly delayed. [7] contains a review of nuclear construction costs worldwide up to 2014 that concludes that significant cost and schedule escalation had taken place in virtually all projects: the reasons identified were 1) need to deploy excessive resources to accelerate construction schedules; 2) use of fundamentally uneconomic designs; 3) increased regulatory demand for safety enhancements; 4) increasing complexity of successive generations of plant designs preventing learning from experience; 5) lack of standardized designs. Similar cost trends were noted in the studies in [8] [9] [10] [11] particularly in Western democratic countries.

Mainly as a result of high capital costs and associated cost uncertainties, the price of electricity generated by nuclear plants in Western counties is above current wholesale power prices and is high in comparison with electricity prices from gas-fired power plants and renewable sources such as wind and solar photo-voltaic, which tend to be subject to smaller cost uncertainties.

To overcome the economic drawbacks associated with the current generation of large reactors (which typically have outputs in the range ≈600-1600 MW (e)) several smaller reactor designs with outputs below ≈300 MW (e) have been proposed. Many of these designs feature modular factory-built equipment which is argued to allow greater standardization of components and processes compared to larger conventional reactors, and hence greater cost certainty. The smaller size also offers potential advantages in terms of overall simplicity, speed of construction and reduced financial risk.

The small modular reactors have a number of design features that are potentially attractive:

- Scalability: Many utilities are reluctant to make large financial commitments with high risk factors due to the fact that large nuclear power plants typically need a period of 5-10 years before revenue starts to become available from the sale of electricity. The scalability of small modular power plants potentially allows utilities to start producing electricity and earning income as soon as the first module is up and running. These earnings could allow the utilities to start investing into a new module and other power plant expansions.
- Modularization: In contrast to large nuclear power plants which have historically been constructed on site, modular construction allows individual nuclear plant components to be constructed in factories and transported to site. Construction in a controlled environment should improve build-quality as well as allowing more precise manufacturing and enhanced quality inspections. Another advantage of modular construction is that different components can be constructed simultaneously around the world and be transported to the specified site at the scheduled time. Developments in modular construction in other engineering fields have allowed for a significantly shortened construction time without compromising quality.
- Simplicity: Smaller and simpler designs with may have fewer components leading to a lower incidence of accidents that could cause damage to the reactor [12]. Another major advantage of a simple design is the reduction in capital costs associated with design and construction of complex safety systems.
- Siting Options: Small modular reactors may be suitable for deployment on more sites than larger reactors. Thus, they may be suitable for installation at isolated off-grid sites such as water desalination plants, or oil rigs, or in remote towns that are distant from a national power grid.

These factors indicate that there is a case to be made to develop smaller reactors with outputs less than ≈300 MW (e) for commercial power generation. However, the review of the economics of small reactor designs in notes that little open source cost information is currently available that can be relied upon to realistically assess costs in comparison with larger reactors. In the case of water-cooled reactor technologies, the small reactor designs are also often complex, involving many of the safety features required in large reactors but on a reduced size scale. As none of the small modular reactor designs has yet been licensed for construction in a Western country it is not clear that the problem of increasing design complexity driven by regulatory requirements will not lead to cost escalation similar to that experienced by current larger plant designs.

Therefore, current nuclear reactors used for commercial electrical power generation are mainly water-cooled reactors with outputs of ~1000 MW (e) that operate at high pressures. Postulated accidents in such plants, due for example to a leakage of primary coolant, or failure of core cooling systems, can result in core meltdown with potentially catastrophic environmental consequences. To address safety concerns, advanced reactor designs have been developed that have a reduced risk of core meltdown and improved resistance to hazards such as earthquakes and aircraft impact. However, the increased complexity of these designs has resulted in escalating construction costs and schedule delays in current projects, which has deterred further investment in Western countries. To improve affordability of nuclear power generation, several smaller reactor designs have therefore been proposed but these are often scaled-down versions of existing larger reactors. It is unclear that the problem of escalating design complexity due to safety demands will not result in similarly high and uncertain investment costs.

New low-pressure water-cooled underground reactors requiring only minimal number of simple safety features are therefore needed.

DESCRIPTION OF THE INVENTION

An object of the present invention is thus to provide an inherently-safe natural circulation reactor that, though achieving a significant power output of around 300 MW (e), retains a simple design with minimal dependence on complex safety features. The design aim is to achieve reduced costs of construction and maintenance at the same time as a significantly reduced environmental risk due to reactor accidents.

This object is fulfilled by a LPWR with the characteristics of claim 1 and by a method with the features of claim 9.

To that end, the present invention proposes, according to a first aspect, a LPWR comprising: a reactor vessel having a body comprising an internal cavity comprising a primary coolant (or moderator) such as water, a riser tube, and a reactor core located below the riser tube, an outer annulus surrounding the reactor vessel as well as the riser tube which forms a downcomer with a given flow area and configured to produce a flow rate of above 10,000 kg/s, the reactor core being located below ground level at, at least, 55 meters depth, with a pressure within a range between 6 and 15 bars atmosphere; a steam drum connected to the riser tube via an upper end of the riser tube, the steam drum being located at ground level with a pressure within a range between 1 and 10 bars, with steam drum steam outlet temperature of 100° C. to 170° C.; a water storage tank connected to the reactor vessel and configured to store borated water (i.e. water that has concentration of boron diluted with it); a passive injection system (i.e. a safety system that injects cooling water into the core which is driven by natural physical forces like density-driven flows (gravity-driven) and pressure-operated valves, and energy stored in springs that drive a possible control rod mechanism/drive module) to inject the borated water from the water storage tank into the reactor vessel; and one or more low pressure steam turbines configured to generate power at a pressure of 1-10 bars atmosphere.

The reactor vessel is configured to heat water up to a certain temperature, without reaching a thermodynamic saturation point, and the riser tube is configured to convert the heated water to steam, which is further delivered to the low pressure steam turbine(s) via the steam drum, whereby the conversion creates a difference in a primary coolant density that initiatives a density-driven natural circulation of the primary coolant in the riser tube, downcomer, steam drum and reactor core.

The simplified and passive nature of the LPWR means that many of the components and safety features that add significantly to the capital and maintenance costs of conventional high-pressure reactor designs are avoided, offering the potential for the cost of electricity produced to be lower than can be achieved with conventional higher pressure reactors.

Particularly, the steam is generated by means of flashing in the riser tube (i.e. via a reduction in pressure due to the elevation changes and frictional pressure-drops as the coolant passes upwards the riser tube). That is, as known in the art, flashing is the production of steam when a high-pressure liquid enters a region of lower pressure, or when the saturation point of water at a section of a pipe drops due to a decrease in pressure at that section of the pipe.

With regard to the flow rate of above 10,000 kg/s it should be noted that there can be other features at the outer annulus that could influence mass flow rate like, for example, an inlet resistance, the configuration of the core (e.g. number of fuel assemblies), spacer-grids, etc. which are features internal to the annulus, but features external to the annulus like a core control package or ports for services and instrumentation should not influence the mass flow rate.

In some embodiments, the riser tube is just an empty tube; however, in some other cases it may be necessary to add rails, pipes or structures and associated cabling for a control rod mechanism to drop down into the core.

In some embodiments, the reactor core is located below ground level at 100 meters depth, or more.

In some embodiments, the reactor vessel further comprises a control rod drive module located above the reactor core.

In a particular embodiment, the reactor core is based on an "off-the-shelf" EPR fuel assembly. Alternatively, in other embodiments, the LPWR is based on other conventional pressurized water reactor fuel assemblies. Although EPR is chosen because it is modern and is expected to be easily available, the invention is not necessarily limited to it.

In some embodiments, the reactor core comprises a number between 120 and 180 of EPR-type fuel assemblies.

In some embodiments, the steam drum comprises one or more driers, a top hatch and a splash plate, and is located within a watertight room.

In some embodiments, the downcomer comprises a steel-lined concrete shaft.

In some embodiments, the water storage tank can be connected to the reactor vessel via passively-operated valves as well as manually operated valves.

The low pressure water reactor can be configured to be shutdown either by means of shutdown rods or by means of the borated water storage tank.

In some embodiments, the borated water comprises at least 1000 parts per million of boron concentration, with height of borated water level above 20 m. More particularly, in some embodiments the borated water is assumed to contain water with 1500 parts per million (ppm) boron concentration. In yet some other embodiments, it is possible to have borated water up to 3000 ppm boron concentration.

In some embodiments, a core inlet temperature is about 100° C. and 150° C., a core outlet temperature is about 140° C. and 170° C., and a core inlet resistance is configured to dampen static instability. In yet some embodiments, the steam drum steam outlet temperature is about 100° C. and 170° C., with a steam drum diameter larger than 10 m, and a steam drum height larger than 3 m.

According to a second aspect, present invention also provides a method for controlling a LPWR, in particular the LPWR of the first aspect of the invention, the method comprising heating, by the reactor vessel, water up to a certain temperature, without reaching a saturation point, and converting, by the riser tube, the heated water to steam, the latter being further delivered to the low pressure steam turbine(s) via the steam drum, whereby the converting step creates a difference in a primary coolant density that initiatives a density-driven natural circulation of the primary coolant in the riser tube, downcomer steam drum and reactor core.

In some embodiments, the method further comprises lifting out the reactor core out of the reactor vessel during refueling operations of the low pressure reactor.

In some embodiments, the method comprises controlling and/or shutting down the passive valves upon a given boron concentration in the primary coolant is reached.

In some embodiments, the reactor core operates with single-phase coolant-moderator during a steady-state operation of the low pressure water reactor while producing the steam with said coolant-moderator.

In some particular embodiments, the different parameters of the proposed LPWR are: core depth of larger than 50 m below ground; core thermal power of 1500 MW to 2500 MW; number of core fuel assemblies of 120-180 EPR-type fuel assemblies; core inlet resistance K between 1 to 3; core inlet pressure of above 6 bar (a); core inlet temperature of 100° C. to 150° C.; core outlet temperature of 140° C. to 170° C.; riser flow area of larger than 5 $m^2$; steam drum pressure of 1-10 bar (a); steam drum outlet temperature of 100° C.-170° C.; steam drum diameter of larger than 10 m; steam drum height of larger than 3 m; turbine inlet pressure of 1-10 bar (a); downcomer flow area above 5 $m^2$; downcomer mass flow rate of above 10,000 kg/s; boron concentration in Reactor Water Storage Tank (RWST) of above 1000 ppm; height of RWST water level of above 20 m;

and/or height of steam dump lines outlet between 10 m to 20 m.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF THE INVENTION AND OF PREFERRED EMBODIMENTS

Present invention proposes a low-pressure water reactor (LPWR) 1 able to achieve a significant power output of around 300 MW (e) while retaining a simple design with a high level of inherent safety. The proposed LPWR 1 is a light water cooled and moderated reactor which operates at pressures close to atmospheric pressure. It is a pool-type design in which the reactor is located underground at the bottom of a deep underground shaft with the primary coolant flow being achieved by density-driven natural circulation with no reliance on electrically driven circulating pumps. The reactor is minimally reliant on active systems for reactivity control or post-shutdown cooling.

Figure 1:
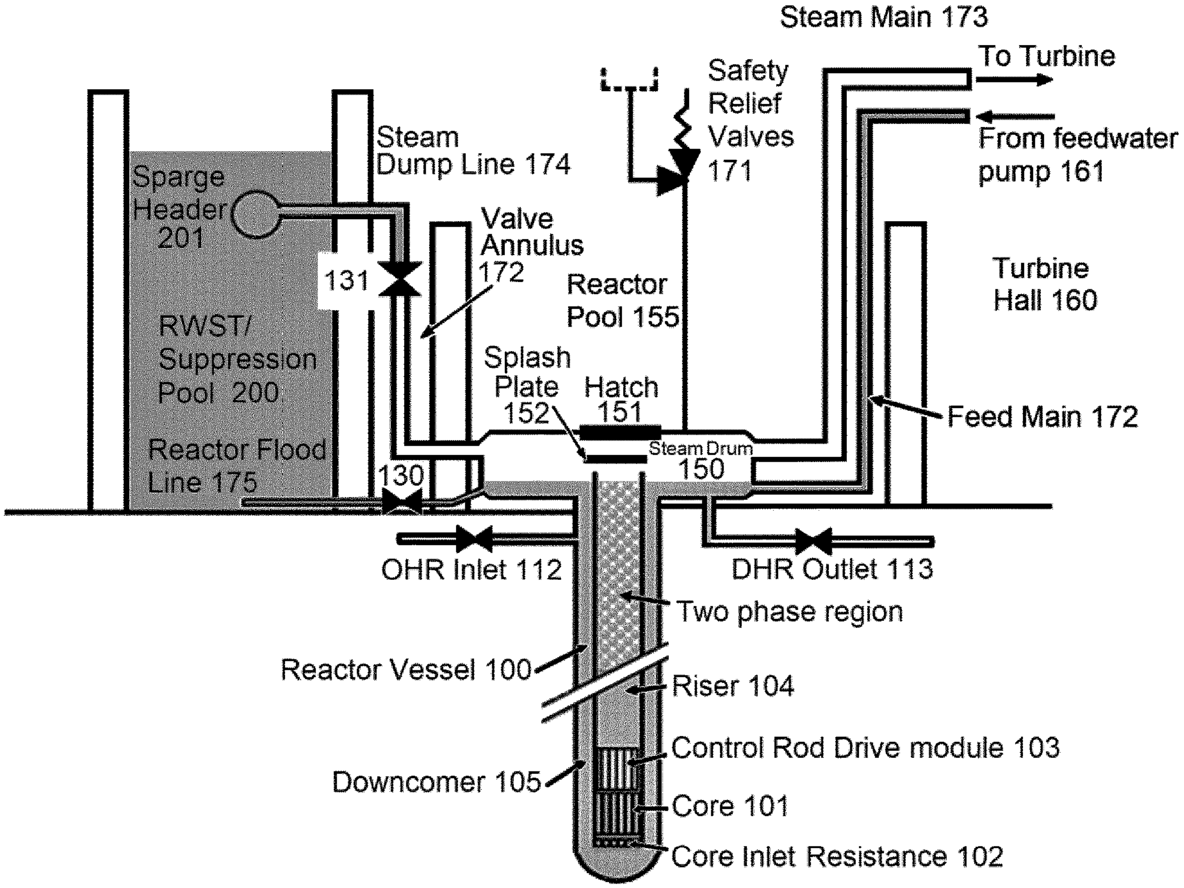
FIG. 1 shows an elevation view of the LPWR in normal operation at power.

FIG. 1 illustrates an embodiment of the proposed LPWR 1. In the LPWR 1, the reactor core 101 is located at the bottom of a deep, concrete-lined shaft, which is connected by passive valves 130 to a high capacity water storage tank (RWST) 200 containing borated water. The design ensures that connection of the reactor to the RWST 200 by highly reliable passive valves 130 will shut down the reactor and provide effective cooling for several weeks, in all foreseeable fault and hazard conditions, even in the absence of operator intervention. In addition, the risk of fuel damage in accidents involving loss of primary coolant or loss of normal heat removal systems is effectively eliminated.

Particularly, according to this embodiment, the reactor vessel 100 is seen to consist of a 5 m diameter pipe 100 m in length with a hemispherical bottom closure, located inside a steel-lined concrete shaft of >100 m depth. A narrow annulus between the reactor vessel outer wall and the shaft wall is used for leak monitoring. The upper end of the reactor vessel 100 is connected to an upright 15 m diameter cylindrical steam drum 150 that acts as a moisture separator. The drum 150 contains driers and a top hatch 151 and splash plate 152 that are removed for refueling. The drum 150 is located within a watertight room (the reactor pool 155) that is flooded during reactor refueling operations.

In normal operation at power the steam pressure in the drum 150 is 2.6 bar abs and the pressure in the inlet plenum below the core 101 is 11.5 bar abs. The reactor vessel 100 contains a co-centric 3.5 m diameter riser tube 104 connected to the steam drum 150 at its outlet end. The 0.75 m wide annulus between the reactor vessel 100 and the riser tube 104 forms a downcomer 105 that provides the driving head for natural circulation flow through the reactor core 101. The reactor core 101 is located at the bottom of the riser tube 104 and consists of a number between 120 and 180 of EPR-type fuel assemblies, particularly 145, that have a design similar to that used in conventional PWRs. It is envisaged that the entire core 101, fully loaded with fuel assemblies, would be lifted out of the riser 104 and placed in a set-down area on the floor of the reactor room 155 during refueling. The reactor control rods drive mechanisms are contained in an assembly module 103 located above the core 101 which would also be relocated into the reactor room 155 during refueling operations. The use of a control rod drive module 103 that is internal to the reactor pressure circuit is similar to that envisaged in current SMR designs such as the NUSCALE and mPower designs [14][15].

In the LPWR 1, primary coolant circulation during reactor operation is driven passively by natural convection without the use of circulating pumps implemented in the design of high-pressure reactors with a comparable power output. Water entering the top of the downcomer 105 from the drum 150 is close to the saturation temperature at the drum pressure, but the water in the core 101 is subcooled due to hydrostatic pressure head developed in the downcomer 105. Therefore, as in a conventional PWR, the primary coolant in the core 101 is predominantly subcooled water (apart from a small region of boiling at the top of the central fuel assemblies), avoiding potential instabilities due to void-induced reactivity feedback. The reduction in pressure due to the elevation changes as the primary coolant passes upwards along the riser tube 104 results in occurrence of two-phase conditions (flashing) above a certain height: the reduced density in the two-phase region significantly enhances the driving head for natural circulation, allowing core mass flow rates to be achieved that are comparable to those in large high-pressure water-cooled reactors that use circulating pumps, thus enabling thermal power levels to be achieved that are comparable to those in high pressure reactors.

After separation of phases in the steam drum 150, steam passes through multiple steam mains 173 to one or more low pressure steam turbines 161 in the turbine room 160. Condensate from the main condensers 162 in the turbine room 160 is returned to the steam drum 150 by feedwater pumps 164 through multiple feed inlet mains 172. Due to the low operating pressure, the mechanical consequences of failure of above-ground primary circuit pipework are tolerable and could not lead to core 101 uncovering or dryout that could cause fuel failures. Failure of the pressure circuit below ground level is also tolerable and would also not lead to fuel damage. As loss of coolant accidents (LOCA) cannot result in a significant release of radioactivity to the environment, the primary circuit in the LPWR 1 can be constructed from low pressure pipework without using the high-integrity forged components normally needed in water cooled reactor designs, avoiding the need for the costly manufacturing and inspection techniques normally required. Additionally, as the primary coolant released in a LOCA will not contain significant radioactivity, the reactor building can be a conventional industrial building with filtered ventilation, rather than a leak-tight containment vessel capable of withstanding high over-pressures, as needed in conventional Light Water Reactor (LWR) designs.

The RWST 200 is a multifunctional storage tank that, while facilitating fuel removal and transfer, also serves as a passive means of providing key safety functions of reactor shutdown and reactor cooling. The high-capacity RWST 200 contains approximately 12,000 $m^3$ of water with a boron content of 1500 ppm, which performs the safety duties of: 1) condensing reactor steam produced following a turbine trip in which the main condensers 162 are unavailable; 2) providing a water source to flood the reactor room 155 during refueling operations; 3) providing a borated water source that ensures that the reactor can be flooded in emergency conditions, ensuring shutdown and cooling of the reactor and a source of makeup water to the spent fuel storage pool if required.

In normal plant shutdowns, or unplanned trips in which the main condensers are available, a turbine bypass valve would open automatically to divert steam produced by the reactor to the main condenser and a Decay Heat Removal System (DHRS) brought into in service to bring the reactor to a cold shutdown state. In accident conditions in which the turbine bypass failed or the main condensers were unavailable, reactor flood valves 130 and steam dump valves 131 would open automatically to connect the RWST 200 to the reactor circuit. To ensure high-reliability fail-safe operation, the flood and dump valves 130, 131 would be held shut by electromagnets during plant operation, and would open passively (under the action of springs or stored compressed air) on interruption of an electrical current that is supplied continuously to the valves 130, 131.

Following operation of the flood & dump valves 130, 131, reactor steam is discharged into the RWST 200 through the sparge header 201, condensing steam produced by the reactor until it is flooded through with borated water. After flood-through, short-term decay heat removal would be by heat-up of water in the RWST 200: long-term decay heat removal would be by operation of the Decay Heat Removal System (DHRS). In the event of failure of the DHRS system, due for example, to long-term loss of all electrical power sources, more than 24 hours would be available before the RWST water reached the saturation temperature. Reactor cooling could be then provided indefinitely by boil-off off and makeup of water to the RWST 200 if the DHRS system could not be restored.

Fuel Storage and Handling

Figure 2:
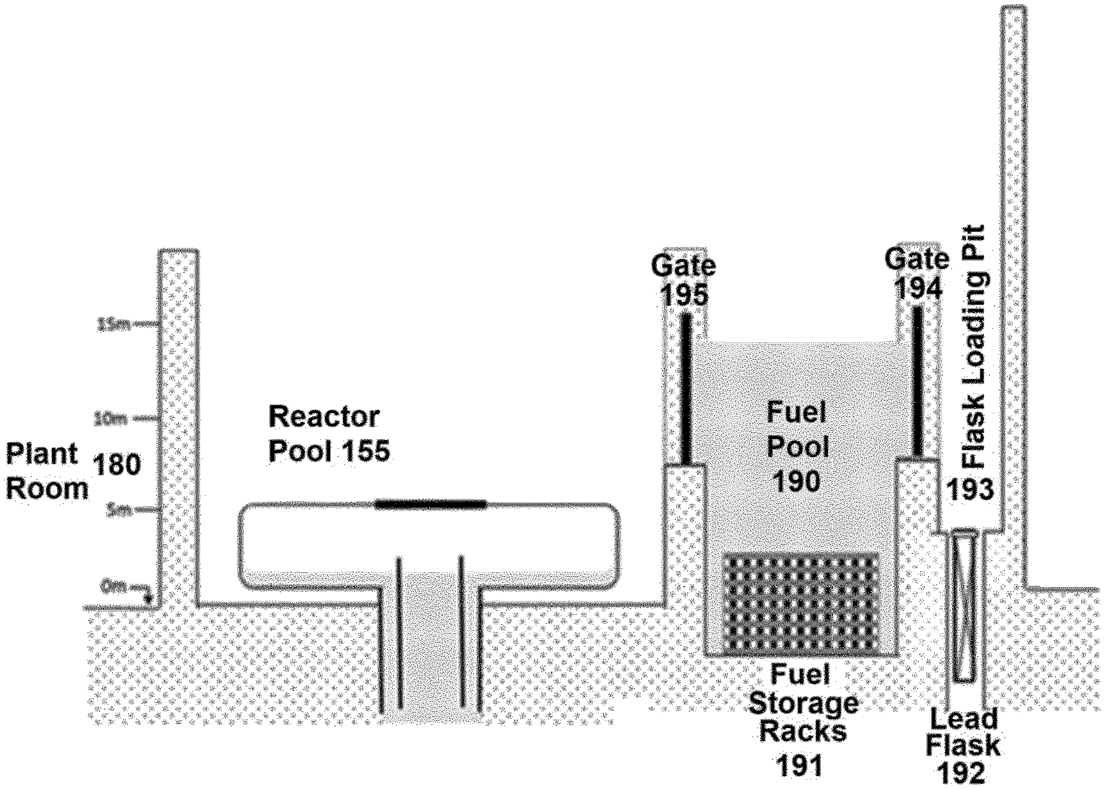
FIG. 2 shows the reactor room and fuel pool configuration during normal reactor operation.
Figure 3:
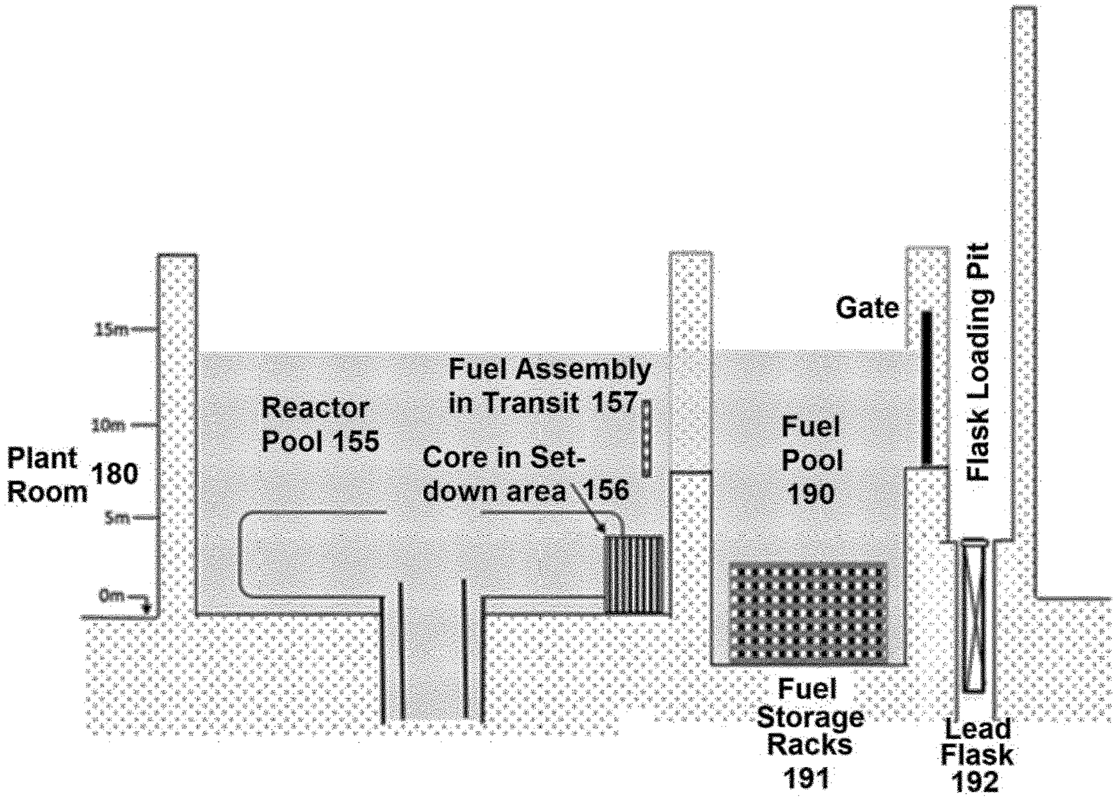
FIG. 3 shows the reactor room and fuel pool configuration during refueling operations.

Spent fuel discharged from the LPWR reactor would be stored in a storage rack 191 located in a fuel storage pool 190 next to the reactor room 155 as shown in FIG. 2. After a period of storage, used fuel assemblies would be transferred to a flask 192 via the flask loading room 193 located next to the fuel storage pool 190, before being transferred to a long-term storage or reprocessing facility. FIG. 3 illustrates the building configuration during refueling. To carry out refueling, the refueling hatch 151 and splash plate 152 would be removed from the steam drum 150, the reactor room flooded with borated water from the RWST 200, and the slot gate 195 connecting the reactor room 155 with the fuel storage pool 190 opened to allow transfer of fuel assemblies to the fuel storage racks 191. Before the fuel assemblies are transferred 157, it is assumed that the control rod drive module 103 and the core 101 fully loaded with the fuel assemblies would have been lifted up the reactor shaft and placed in set-down areas in the reactor room 155 to facilitate access. Following loading of new assemblies and repositioning of fuel assemblies that are to be re-used, the re-loaded core would be lowered into the reactor shaft and the control rod drive module 103 replaced and control rod latches reengaged.

Engineered Safety Features

Nuclear power plants contain engineered safety features (ESFs) to control core reactivity and provide core cooling and containment of radioactive materials in operating and accident conditions that the plant might experience during its lifetime. In the case of current water-cooled reactor designs, the major ESFs include (1) a leak-tight containment structure that houses the reactor pressure circuit, designed to contain radioactive materials that could be released in a loss of coolant accident (LOCA); (2) emergency core cooling and injection systems designed to remove decay heat and refill the reactor in accident conditions, and (3) systems for cooling spent fuel in the fuel pool and during fuel handling. These ESFs require support systems to provide electrical power and control, cooling and ventilation, as well as systems, structures and components to protect essential equipment against hazards such as flooding, fires and explosions etc. The ESFs and their support systems must be safety classified according to the importance of their safety role and designed accordingly. Nuclear safety classified structures, systems and components are subject to higher standards of design, construction and maintenance than conventional equipment and as a result providing the necessary ESFs and their support systems has a major impact on the construction and maintenance costs of modern nuclear power plants.

As the LPWR 1 contains a much smaller number of ESFs than are needed by the current generation of high-pressure water-cooled reactors, LPWR 1 construction and maintenance costs are likely to be substantially lower. Below the main ESFs required in the LPWR 1 are listed and compared with the equivalent requirements for a high-pressure reactor. It must be realized that in addition to the ESFs, other major systems would be required to operate an LPWR plant, such as a coolant chemical and volume control system and the turbine/condensate power conversion system, but these are not considered in the present patent application as they make a relatively minor contribution to construction and operating costs of current NPPs.

Containment Structure

Current designs of high-pressure water reactors require the reactor primary circuit to be enclosed in a large leak-tight containment structure with a high overpressure resistance capability. The requirement for a containment building arises because, in the event of large break loss of coolant accidents (LOCA), fuel dry-out and overheating occurs, leading to rupture of fuel pins and release of radioactive fission products into the reactor pressure circuit. Enclosing the pressure circuit in a leak-tight containment ensures that leakage of radioactivity into the environment remains within safe levels in these circumstances. The containment structure also provides a barrier to the release of radioactivity in the event of severe core damage due to failure to restore core cooling in a LOCA or other accidents.

The LPWR 1 design concept ensures that fuel failures will not occur in any accident scenario provided the integrity of the concrete walls of the RWST 200, reactor pool 155, and fuel pool 190 is maintained. Therefore, there is no requirement for a leak-tight containment building to retain fission products released from failed fuel in accident conditions:

thus the reactor can be housed in a conventional building equipped with a filtered ventilation system.

Emergency Core Cooling Systems

Emergency core cooling systems used in water cooled reactors generally consist of multiple subsystems or 'trains' containing high capacity pumps, heat exchangers and accumulator tanks that are designed to inject coolant into the reactor and re-establish long-term core cooling in emergency conditions. To satisfy design requirements normally applied to nuclear safety systems, the emergency cooling system in a conventional PWR will typically consist of four identical trains, with a diverse backup system provided to cover the case of common cause failure of all four trains.

In the LPWR 1, short-term emergency core cooling is achieved by the opening of multiple redundant valves 130, 131 in the reactor flood and steam dump lines 175, 176 connecting the reactor vessel 100 to the RWST 200, which results in density-driven flood-through of the reactor with borated water. To ensure a high reliability of the valves opening on demand, the flood & dump valves 130, 131 are assumed be held shut by electromagnets and to open passively (driven by springs or stored compressed air) on interruption of an externally supplied electrical current. Particularly, to achieve principles of redundancy and diversity two independent sets of valves are provided with diverse designs.

After flood-through of the reactor vessel 100, decay heat would be removed in the short term by natural circulation (thermosyphon) loops created by the downcomer/core/riser 105, 101, 104 and the RWST/drum/steam-dump lines 174, 175. In the long-term, decay heat removal would be achieved by manually initiating a Decay Heat Removal System (DHRS) containing pumps and heat exchangers which rejects heat to a component cooling water system. Under worst-case accident conditions, connection of the DHRS within 24 hours will avoid boiling of water in the RWST 200.

Figure 4:
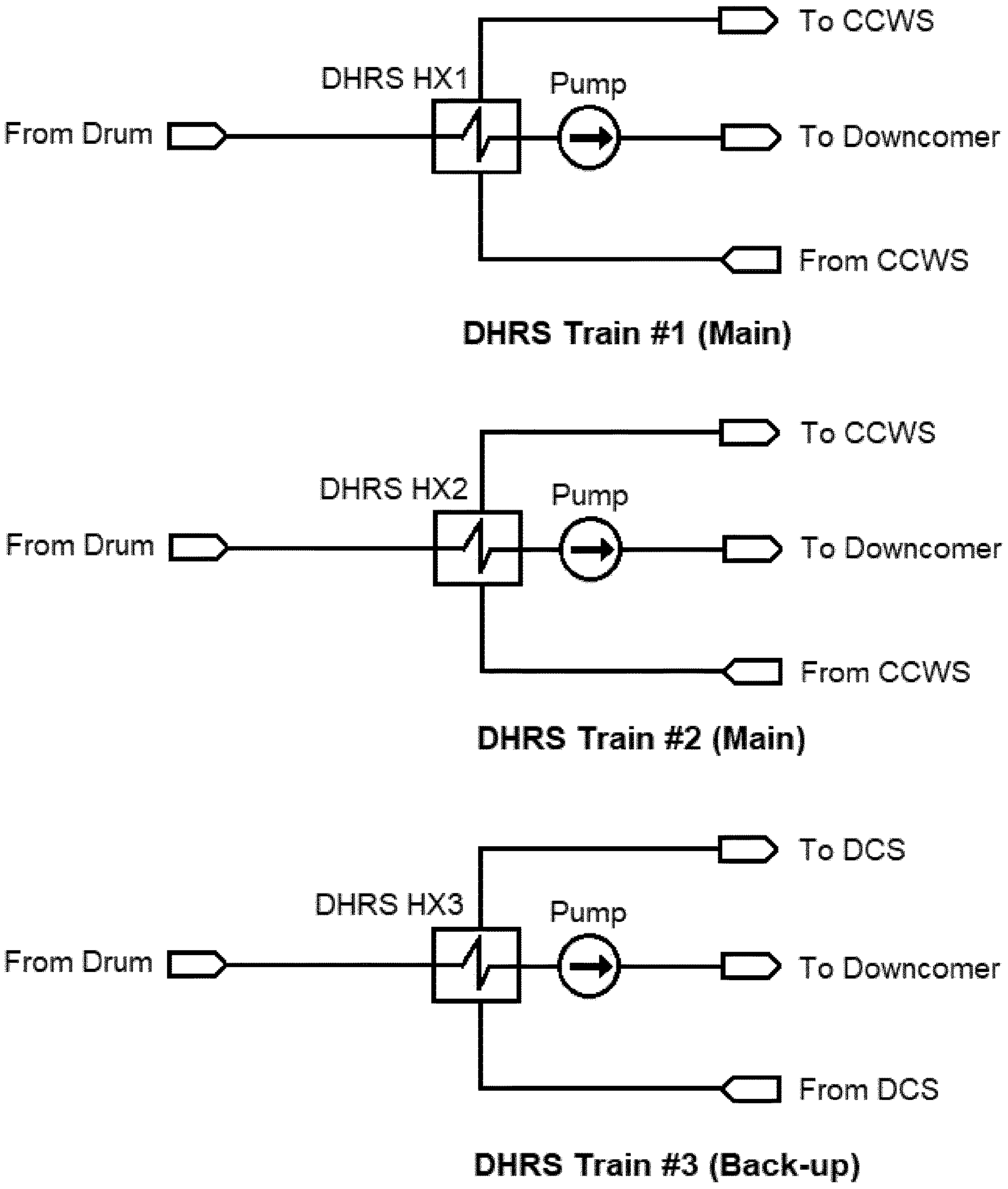
FIG. 4 shows the DHRS System, according to different embodiments.

In an embodiment, to achieve principles of redundancy and diversity, the DHRS is assumed to consist of 2 main trains that are normally in operation and 1 back-up train that is normally on standby, as shown in FIG. 4. The two operating trains reject heat to a fresh-water component cooling water system (CCWS) which is in turn cooled by seawater or river-water service water system (SWS) that provides an ultimate heat sink. The $3^{rd}$ backup train is to be cooled by a diverse cooling system (DCS) that rejects heat to a diverse heat sink (DHS). The DHRS is designed so that any one of the three trains would be functionally capable of maintaining the reactor cooling water below an acceptable temperature limit after 24 hours post-shutdown.

Fuel Pool Cooling System

The main purposes of the Fuel Pool Cooling System (FPCS) are 1) to remove decay heat from the spent fuel in the fuel storage pool 190 or in the reactor pool 155 during refueling operations, 2) to purify water in the pools to help control radioactivity levels 3) to transfer water between the different compartments for fuel handling operations, and 4) to supply makeup water to the fuel pool 190 or reactor pool 155 in the event of a failure of alternative cooling system. The design of fuel storage and fuel handing systems in the LPWR is expected to be similar to those in a conventional PWR.

Figure 5:
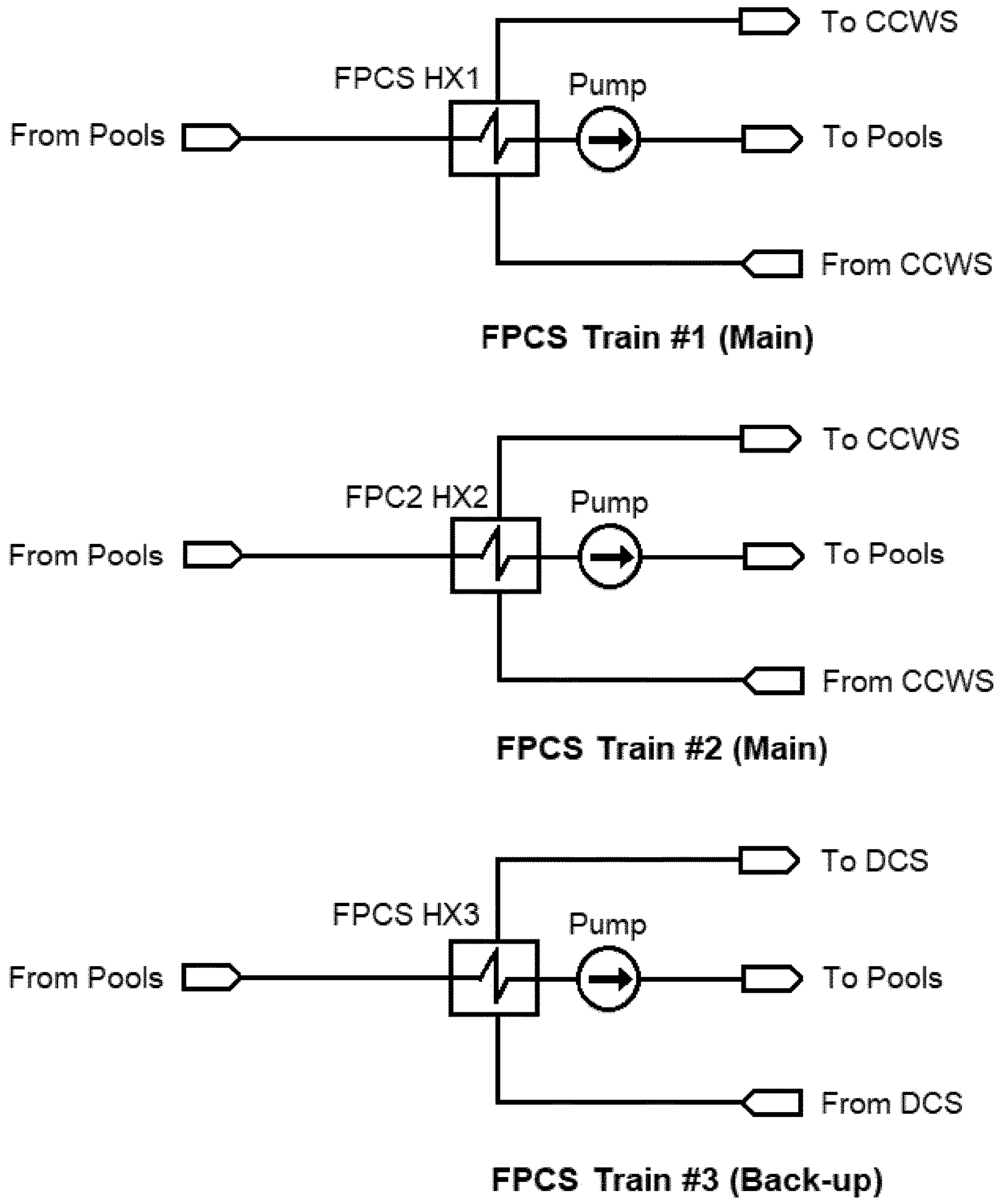
FIG. 5 shows the FPCS System, according to different embodiments.

To achieve principles of redundancy and diversity discussed previously the FPCS, similarly to the DHRS described above, in some embodiments would comprise 2 main trains that are normally in operation, and 1 back-up train normally on standby, see FIG. 5, with the two operating trains rejecting heat to the CCWS/SWS heat sink, and the backup train rejecting heat to diverse DCS/DHS heat sink. Each train of the FPCS would be designed to be functionally capable of maintaining the reactor cooling water at a significant margin below 100° C. at the maximum heat load due to spent fuel decay heating.

The penetrations in the walls of the fuel pool and reactor pool that are connected to the suction and discharge lines of the FPCS would be positioned at a high level so that breaches in FPCS pipework could not lead directly to uncovering of fuel in the fuel storage racks 191. Penetrations connected to the main trains of the FPCS would be located above the penetrations for the standby trains to ensure that the standby system would remain available following partial pool drainage due to pipework breaches in an operating train. In the event of failure of all FPCS trains, pool cooling would still be possible by supplying gravity fed makeup from the RWST 200 to compensate for evaporation losses in the pools.

Control & Protection System

A safety classified control and protection system (C&PS) can be further provided to actuate safety features such as the reactor trip system, the flood & dump valves 130, 131 or the decay heat removal system in the event of abnormal plant operating conditions being detected or in response to operator actions in the Control Room. Due to the relatively small number of active safety features in the LPWR 1 design, the C&PS for the LPWR is likely to involve a much smaller number of safety functions than a large high-pressure reactor design in which the main control and protection system may involve hundreds of safety functions.

The C&PS for the LPWR is envisaged to consist of a main system which operates front-line safety equipment and an independent backup system of a diverse design that would operate diverse back-up safety features such as the standby trains of the DHRS and the backup electrical generators. Both the main and back-up C&PS would be nuclear safety classified.

Emergency Electrical Power System

In normal circumstances, electric power to plant equipment would be provided by an external grid connection. In emergency conditions, availability of the grid connection cannot be assumed, as the external grid is not safety classified. Therefore, emergency generators would be required to provide power to operate safety equipment.

The emergency power system for the LPWR 1 in some embodiments is envisaged as consisting of 2 main diesel generators which would operate front line safety equipment and a backup diesel generator of a diverse design that would operate the diverse backup safety features. A fourth diesel can be provided to be used during maintenance operations. An uninterruptable battery backed power supply would be available to provide temporary power to the plant control systems and provide emergency lighting in the event of a temporary loss of all emergency generators.

Loss of external grid connections would result in automatic reactor trip and automatic opening of the reactor flood and dump valves 130, 131, allowing the reactor vessel 100 to be brought to a controlled state for at least 24 hours before boiling occurs in the RWST 200 or Fuel Storage Pool 190. Long-term cooling would be established by operating the DHRS & FPCS after restoration of power supplies, but if this were not possible, cooling could be sustained indefinitely by providing a small makeup flow to the RWST 200 to compensate for evaporation losses.

As the only ESFs requiring significant electrical power in the LPWR 200 are the DHRS and FPCS cooling trains, which operate at low pressures, the power requirements of the emergency diesel generators in the LPWR 200 would be much lower than in a conventional high-pressure water-cooled reactor where there are many more ESFs, and multiple high-head high-flow capacity pumps are required for emergency core cooling. Considering the energy requirement to operate the trains of the DHRS & FPCS, it is estimated that the diesel generator power required for the LPWR diesels would be of order 100 KW/unit.

Core Design

The LPWR 1 will use fuel similar to that used in current PWR designs, as extensive operating experience is available for this fuel type. Current EPR designs use $UO_2$ fuel with a maximum enrichment ($U^{235}$ content) of 5% by weight. The fuel is in the form of cylindrical pellets of $UO_2$ contained in 9.5 mm diameter tubes made of M5 zirconium alloy cladding that are pressurized with helium gas. The fuel assemblies are approximately 4.8 m long with a fueled length of 4.2 m, each containing 265 fuel rods and 24 guide tubes that are used to house absorber rods or in-core instrumentation. The EPR core contains 241 fuel assemblies.

Figure 6:
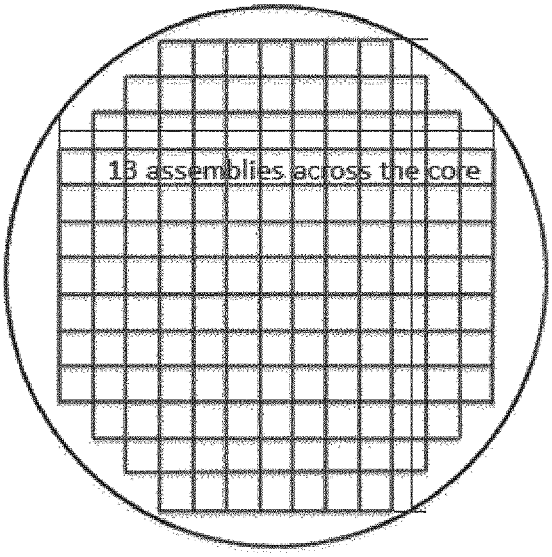
FIG. 6 shows the LPWR core, according to an embodiment.

FIG. 6 illustrates a particular embodiment of the proposed reactor core 101 comprising 145 EPR-type Fuel Assemblies, which is specifically selected to achieve the target thermal power of 2000 MW(th).

According to an embodiment, the principal dimensions and material properties of the fuel rods, fuel assemblies and core 101 assumed for the LPWR 1 design are summarized in the following Table 1.

TABLE 1

Dimensions and Physical Properties of LPWR Fuel Assemblies & Core

| Parameter | Value |
|---|---|
| Fuel Rod Outside Diameter | 9.5 mm |
| Fuel Rod Lattice Pitch | 12.6 mm |
| Core Sub-channel Hydraulic Diameter | 11.8 mm |
| Clad Thickness | 0.57 mm |
| Diametrical Gap (Pellet/Clad) | 0.17 mm |
| Fuel Rod Heated Length | 4.2 m |
| Number of Rods/Fuel Assembly | 289 |
| Number of Fuel Rods/Fuel Assembly | 265 |
| Assembly Dimensions (mm) | 214 × 214 |
| Fuel Assembly Length (approx.) | 5.0 m |
| Number of Fuel Assemblies in Core | 145 |
| Core Flow Area | 3.68 $m^2$ |
| Core Physical Diameter | 3.2 m |
| Fuel Rod Cladding Material | M5 |
| Cladding Thermal Conductivity (500K) | 15.0 W/mK |
| $UO_2$ Thermal Conductivity (600K) | 5.0 W/mK |
| He Thermal Conductivity | Obtained from correlation. |

The following describes the analysis of the steady state performance characteristics of a power plant in which the proposed LPWR 1 provides the steam source.

Thermal Hydraulic Design

As explained before, the LPWR 1 is a light water cooled & moderated pool-type reactor operating at close to atmospheric pressure that is designed to effectively eliminate the risk of accidents leading to a significant release of radioactivity to the environment. The enhanced safety is achieved by locating the reactor core 101 at the bottom of a deep shaft that is connected by passive valves 130, 131 to a large above-ground storage tank 200, ensuring that the core 101 can be cooled in all foreseeable fault and hazard conditions. In particular, the combination of a low operating pressure and large primary coolant inventory allows the risk of fuel overheating in loss of coolant accidents, or following loss of normal heat removal systems, to be effectively eliminated in the LPWR 1. A design objective of the LPWR 1 is to achieve a low capital cost per megawatt of electricity produced by removing the need for engineered safety features such as a leak-tight containment building that may dominate the capital costs of a high-pressure reactor design.

Figure 7:
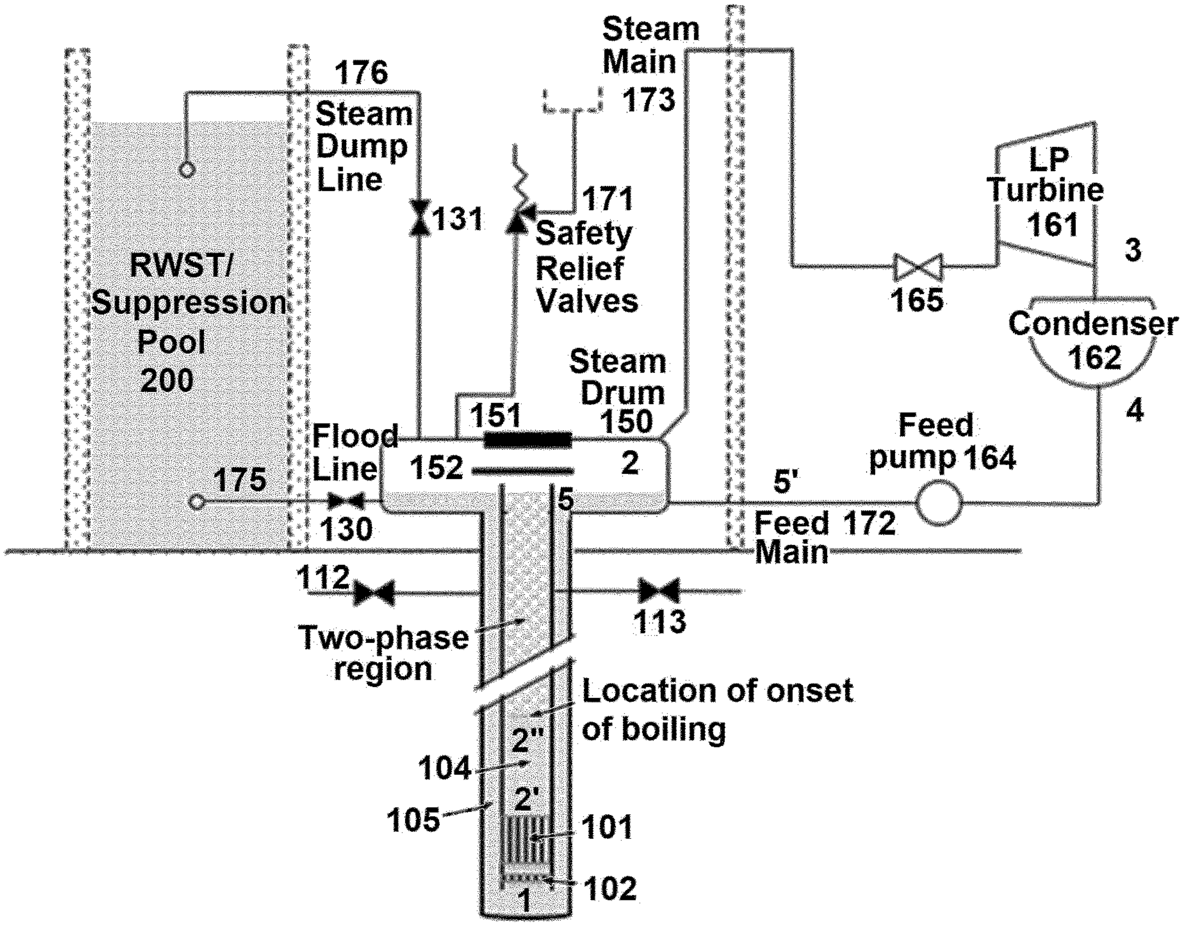
FIG. 7 is a schematic of the LPWR, according to another embodiment.

With reference now to FIG. 7, therein another design schematic of the proposed LPWR 1 is shown. As described previously, in reactor operation the upper section of the riser 104 above the core 101 contains two-phase steam-water flow created by flash boiling, but the core 101 itself is cooled by sub-cooled pressurized water.

Preliminary Steam Cycle Analysis

Water cooled reactors have been previously designed to operate at high pressures to achieve high thermal efficiencies. In the LPWR 1, it is theorized that low thermal efficiency may not be so much of a problem as uranium fuel costs are relatively low. However the economic feasibility of the LPWR 1 depends on achieving a sufficient thermal efficiency. A preliminary assessment of the thermal efficiency is given below.

The proposed LPWR 1 in some embodiments employs a modified Rankine Cycle. The basic Rankine Cycle involves a boiler, turbine 161, condenser 162 and pump components. Heat delivered to the boiler is passed to a working fluid (typically water) to generate vapor. The pressurized vapor is used to drive a turbine 161 which performs useful work. The steam that leaves the turbine 161 is cooled and returned to a liquid state in a condenser 162 in which heat is passed to an external heat sink (typically water in a river or ocean). The condensed liquid leaving the condenser 162 is returned to its initial operating pressure by the use of a feed pump.

To estimate the thermal efficiency of a system operating at different turbine inlet pressures, the starting point is the simple Rankine cycle. A condensate temperature of 25° C., i.e. $T_3=T_4=298K$ can be assumed. At the condenser outlet the condensate pressure is raised by the feed pump to the system pressure, $P_{sys}$. The compression, which can be assumed to be approximately isentropic, results in a small increase in the fluid temperature at an entry of the boiler.

The enthalpy and entropy of the fluid at an entry of the feed pump is the saturated liquid enthalpy at the condenser outlet temperature (298K), which can be obtained from:

$$h_4 = h_{fSAT}(T_4) \tag{1.1}$$

$$S_4 = S_{fSAT}(T_4) \tag{1.2}$$

As the compression is assumed to be isentropic, the enthalpy at the pump outlet is given by:

$$h_5 = h_f(P_{sys}, S_4) \tag{1.3}$$

which can be obtained from standard steam tables (an example thereof can be found at www.thermopedia.com).

The fluid at the outlet of the feed pump is heated and evaporated by heat energy supplied by the reactor core 101, eventually reaching the saturated steam condition at the turbine 161: where the steam enthalpy, temperature and entropy at the entry of the turbine 161 can be evaluated from steam tables.

$$h_2 = h_{gSAT}(P_{sys}) \tag{1.4}$$

$$T_2 = T_{SAT}(P_{sys}) \tag{1.5}$$

$$S_2 = S_{gSAT}(P_{sys}) \tag{1.6}$$

The fluid expands in the turbine 161 at the condensate temperature. In some embodiments, it is assumed that the expansion is isentropic, therefore ignoring inefficiencies of the turbine 161. Denoting the steam quality at location 3 by $X_3$ it follows that:

$$X_3 = \frac{S_2 - S_{fSAT}(P_{sys})}{S_{gSAT}(P_{sys}) - S_{fSAT}(P_{sys})} \tag{1.7}$$

From the steam quality at the entry of the condenser 162, the enthalpy at that location can be calculated as $$h_3 = h_{fSAT}(T_4) + X_3(h_{gSAT}(T_4) - h_{fSAT}(T_4)) \tag{1.8}$$

With the evaluation of enthalpies, the amount of work done by the system per kg of working fluid can be evaluated:

$$\text{Work}_{net} = \text{Work}_{Turbine} - \text{Work}_{pump} \tag{1.9}$$

$$\text{Work}_{Turbine} = h_2 - h_3 \tag{1.10}$$

$$\text{Work}_{Pump} = h_5 - h_4 \tag{1.11}$$

The input heat into the system per kg is total enthalpy change between the feed pump outlet and the turbine inlet:

$$Q_{in} = h_2 - h_5 \tag{1.12}$$

Therefore, the thermal efficiency of the cycle is given by:

$$\eta_{th} = \frac{\text{Work}_{net}}{Q_{in}} = 1 - \frac{h_3 - h_4}{h_2 - h_5} \tag{1.13}$$

The values of $h_1$, $h_2$, $h_3$ and $h_4$ can be found from (1.3, 1.4, 1.8 and 1.1 respectively). This allows the cycle efficiency to be found for different values of system pressure.

The expansion through the turbine 161 from the entry thereof to the entry of the condenser 162 is assumed to be isentropic. However, realistically it is expected that the expansion would involve an increase of entropy. Therefore, the entry of the condenser 3 is proposed where its enthalpy can be evaluated by including an isentropic efficiency factor, $\eta_S$.

$$n_s = \frac{h_2 - h_{3(s)}}{h_2 - h_3} \tag{1.14}$$

Therefore, the enthalpy is:

$$h_{3(s)} = h_2 - \eta_s(h_2 - h_3) \tag{1.15}$$

Consequently, the non-isentropic thermal efficiency can be evaluated from Equation (1.13) as:

$$\eta_{th(s)} = \frac{\text{Work}_{net}}{Q_{in}} \tag{1.16}$$

Where from Equations 1.9 and 1.10, $$\text{Work}_{net} = (h_2 - h_{3(s)}) - \text{Work}_{pump} \tag{1.17}$$

From Rankine Cycle calculations for various system pressures, $P_{sys}$, it is seen that the thermal efficiency of a power plant decreases with decreasing system pressure. In some embodiments, a steam cycle calculation was produced from equations (1.13) and (1.16) with a Microsoft Excel spreadsheet to analyze how thermal efficiency is related to system pressure and the results are plotted in FIG. 8.

From the relationship above, it can be seen that the thermal efficiency of the power plant falls markedly with system pressure. However, somewhat surprisingly, the thermal efficiency at 1 bar is only half of that at 50 bar which is the nominal steam pressure of conventional pressurized water reactors, suggesting that low pressure water reactors may be capable of significant electrical output.

The LPWR reactor steam cycle is rather different from the Rankine Cycle described before. At the inlet plenum the fluid is sub-cooled water with an enthalpy approximately equal to the enthalpy of the saturated water in the steam drum 150 that had entered from the top of the downcomer 105. This sub-cooled water enters the reactor core 101 and is heated but remains in the sub-cooled liquid state at the reactor outlet. As the water flows up into the riser tube 104, its pressure decreases due to the reduction in hydrostatic pressure and eventually it reaches the saturation pressure at the point of onset of flashing. At the point of flashing, nucleate boiling starts to occur, and a two-phase flow is generated which flows out of the riser 104 into the steam drum 150. Phase separation occurs in the drum 150 and saturated steam is delivered to the steam turbine 161 via the steam mains 173 where it is expanded to sub-atmospheric pressure in the condenser 162. Saturated condensate emerges from the condenser 162 and is re-pressurized to the drum pressure by the feed pump 164. The water is then mixed with the saturated water in the drum 150 before returning to the inlet plenum via the downcomer 105.

Figure 8:
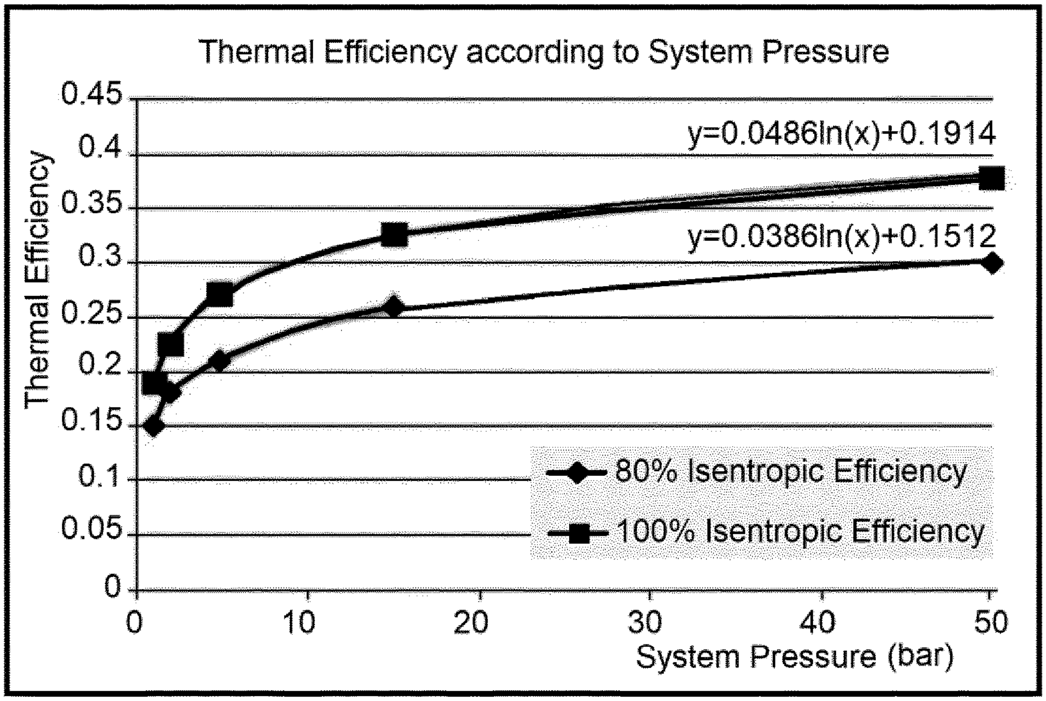
FIG. 8 shows the changes in thermal efficiency according to system pressure.
Figure 9:
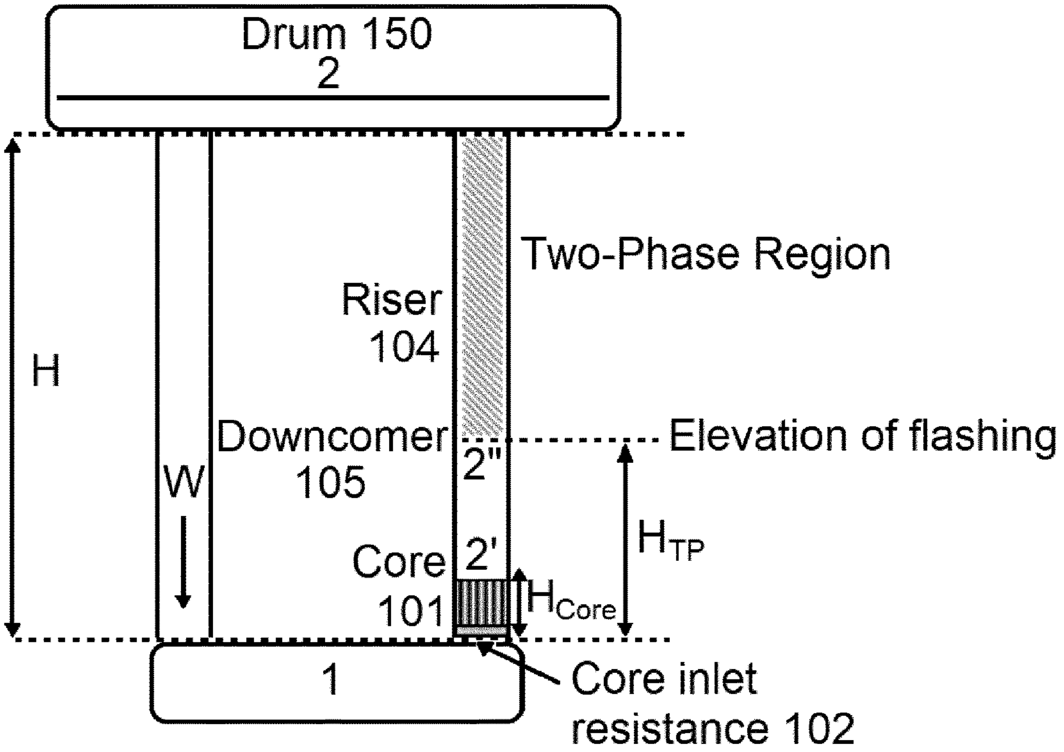
FIG. 9 shows the loop natural circulation flow in steady state operation.

In the proposed LPWR 1 steam generated by flashing in the riser 104 is fed into a low-pressure turbine 161. The creation of two-phase conditions in the riser 104 increases the net pressure driving head for natural circulation flow in the downcomer 105 and riser 104, allowing mass velocities in the core 101 that are much higher than those usually associated with natural circulation, and which are potentially comparable to those achieved in high-pressure water-cooled reactors that use pumped flow. Preliminary calculations were carried out of flow rates achievable in the LPWR 1 for different power levels and core depths using the model shown in FIG. 9, and the results are shown in FIG. 8.

To calculate the steady state natural circulation flow rate W in the above system, an iterative procedure is used, using the one-dimensional energy and momentum conservation equations for the loop. The drum pressure $p_2$ and the core power $\dot{Q}$ are taken as boundary conditions.

The loop flow W is first estimated, and the core exit enthalpy calculated from an energy balance as:

$$h_2' = h_2'' = h_{f,SAT} + \dot{Q}/W \tag{1.18}$$

where $h_{f,SAT}$ is the saturated liquid enthalpy at the drum pressure, (which by energy conservation is the same as the enthalpy of the liquid that enters the core 101), $$h_2'$$

is the core outlet enthalpy and $$h_2''$$

is the liquid enthalpy at the point of flashing (heat losses from the loop are neglected, and small kinetic and potential energy terms are also neglected).

Using the estimated loop flow, the pressure drop is then determined for the downcomer 105, the single-phase portion of the riser 104 between the riser inlet and the location of flashing, and the two-phase region in the riser 104 above the point of flashing. For each of these regions, a pressure loss factor K is calculated, as defined by the equation $$\Delta P_{fric} = K\frac{W^2}{\rho} \tag{1.19}$$

where ρ is the mean density in the two-phase region. The pressure loss factors for the 3 regions are given by:

$$K_{DC} = C_{IN,DC}\frac{0.5}{A_{DC}^2} + C_{OUT,DC}\frac{0.5}{A_{DC}^2} \tag{1.20}$$

$$K_R = C_{IN,R}\frac{0.5}{A_R^2} + K_{IN} + \left(\frac{4fH_{core}}{D_C}\right)\frac{0.5}{A_C^2} \tag{1.21}$$

$$K_{TP} = C_{OUT,R}\frac{0.5}{A_R^2} \tag{1.22}$$

where $C_{IN}$ and $C_{OUT}$ refer to pressure losses coefficients due to expansion or contraction at the inlet and outlet of a component, the subscript DC, C and R refer to the downcomer 105, reactor core 101 and the riser 104, respectively, and $H_{CORE}$ is the core height. $K_{IN}$ is a flow resistance factor of a core inlet resistance 102 introduced to achieve stability. Pressure losses due to wall friction are ignored in the riser 104 and downcomer 105 (except in the core 101), as due to the large pipework diameter, they are expected to be negligibly small.

The pressure at the point of flashing $$p_2''$$

is simply the saturation pressure corresponding to the core exit enthalpy $$h_2''$$

given by (1.18).

The pressure at the core exit is calculated by applying the momentum equation between the downcomer inlet and the core exit (Location 2'):

$$p_2' = p_2 - (K_{DC} + K_R)\frac{W^2}{\rho_f} + \rho_f g(H - H_{Core}) \tag{1.23}$$

where the resistance factors are found from (1.20 and 1.21) and small changes in liquid density $\rho_f$ around the loop are ignored.

Using (1.23) the height of the point of flashing above the core inlet, $H_{TP}$ can be found from a momentum balance between locations 2' and 2", noting that pressure losses due to pipe wall friction are negligible:

$$p_2'' = p_2 - \rho_f g(H_{TP} - H_{Core}) \tag{1.24}$$

Where $$p_2'',$$

the pressure at the point of flashing, is simply the saturation pressure corresponding to the core exit enthalpy $$h_2''$$

given by equation (1.18), which can be found from the steam tables.

The flow quality at the exit of the riser 104 $X_{OUT,R}$ is determined from an energy balance for the two-phase region:

$$X_{OUT,R}h_{gSAT} + (1 - X_{OUT,R})h_{fSAT} = h_2' \tag{1.25}$$

Where $h_{gSAT}$ and $h_{fSAT}$ are the saturation enthalpies of the steam and water phases, which are approximated by the saturation values at the drum pressure.

Given $X_{OUT,R}$, the void fraction and two-phase density at the riser exit can be found using an assumption of homogeneous two-phase flow:

$$\frac{(1-\alpha_{OUT,R})}{\alpha_{OUT,R}} = \frac{(1-X_{OUT,R})}{X_{OUT,R}}\frac{\rho_{gSAT}}{\rho_{fSAT}} \tag{1.26}$$

$$\rho_{OUT,R} = \alpha_{OUT,R}\rho_{gSAT} + (1-\alpha_{OUT,R})\rho_{fSAT} \tag{1.27}$$

Where $\rho_{gSAT}$ and $\rho_{fSAT}$ are the saturation densities of the steam and water phases, which are again approximated by the saturation values at the drum pressure.

From (1.27) the mean density in the two-phase region of the riser 104 is approximated as $$\rho_{TP} = 0.5(p_f + \rho_{OUT,R}) \tag{1.28}$$

Finally, a loop momentum balance is found to derive a second equation for the height of the point of flashing that is consistent with the assumed value of W:

$$g(H-H_{TP})(\rho_f-\rho_{TP}) = (K_{DC}+K_R)\frac{W^2}{\rho_f} + K_{TP}\frac{W^2}{\rho_{TP}} \tag{1.29}$$

The loop flow rate consistent with the core power and the drum pressure is found by adjusting the guessed value of W until the location of flashing $H_{TP}$ given by (1.24 and 1.29) is equal.

Description of Steady State Core Model

Figure 10:
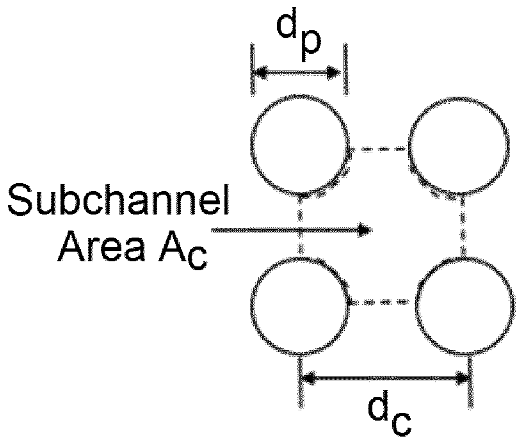
FIG. 10 shows the sub-channel form used in the LPWR core model.
Figure 11:
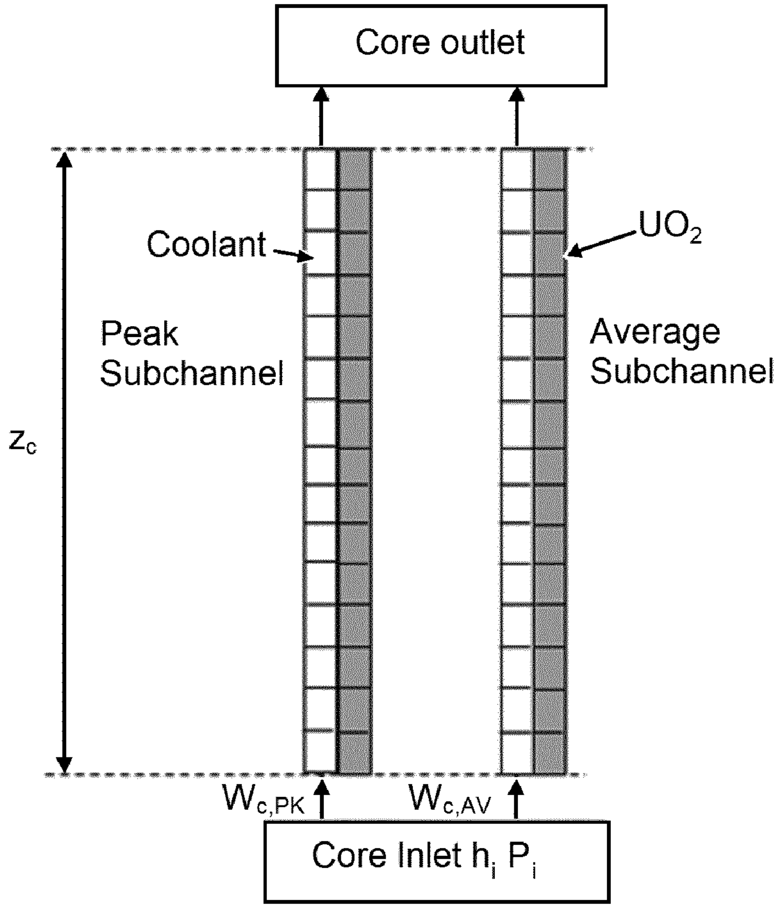
FIG. 11 shows the core peak and average sub-channels.

Particularly, in the LPWR core model, the heated core 101 is represented as an open array of fuel pins between which there are sub-channels formed by the flow passages between individual fuel pins. A representative sub-channel is shown in FIG. 10. Two representative sub-channels are modelled in the core 101, representing peak and average power sub-channels as shown in FIG. 11: the peak sub-channel corresponds to the sub-channel adjacent to the highest rated fuel pins and the average sub-channel represents the rest of the core. The core model calculates the fluid enthalpy, pressure and density and the fuel rod temperature in each axial cell in both the peak and average sub-channels, given boundary conditions for rod power and the mass flow rate, pressure and enthalpy of the coolant at the sub-channel inlet. The governing equations of the model are described below.

Calculation of Fluid Conditions in the Core:

It is assumed that the inlet mass flux is uniform across all core sub-channels. In reality, in a LPWR the reduced fluid density in the high-power sub-channels would be expected to result in a slightly higher driving head for natural circulation, resulting in the inlet flow in the peak sub-channels, $W_{c,PK}$, being greater than that in the average sub-channel, $W_{c,AV}$. Hence the assumption of uniform flow is conservative for calculating margins to thermal limits in the peak core sub-channel.

Applying the uniform flow assumption:

$$W_{c,PK} = W_{c,AV} = W_{CORE}A_c/A_{CORE} \tag{1.30}$$

The axial power distribution is assumed to be the same in fuel rods at any radial position. The axial power distribution in both the peak and average sub-channel is assumed to be described by the following symmetric cosine distribution that would apply to a bare cylindrical reactor in which the effects of temperature on local core power are neglected:

$$q''_z = q''_{z,max}\cos\left[\frac{2\varepsilon}{L_{CORE}}\left(z-\frac{L_{CORE}}{2}\right)\right] \tag{1.31}$$

For the average channel, the peak heat flux is defined using the axial peaking factor for the core through the equation:

$$q''_{z,max,AV} = P_f q''_{z,avg,CORE} \tag{1.32}$$

The average fuel pin heat flux in the entire core is just the total core power divided by the total heat transfer area:

$$q''_{z,avg,CORE} = \dot{Q}_{CORE}/\pi d_p L_{CORE} N_{FR} \tag{1.33}$$

where:

$N_{FR}$=total number of fuel rods in core

For the peak sub-channel, the maximum heat flux is given by:

$$q''_{z,max,PK} = F_{\Delta H}q''_{z,max,AV} = P_f F_{\Delta H} q''_{z,avg,CORE} \tag{1.34}$$

where $F_{\Delta H}$ is the so-called hot-channel factor defined as the ratio between the enthalpy rise in the hot subchannel and the mean enthalpy rise in the core, which is assumed to be a known boundary condition.

Using (1.31) the mean heat flux in the average sub-channel is $$q''_{z,avg,CORE} = \frac{1}{L_{CORE}}\int_0^{L_{CORE}} q''_z dz = \frac{1}{L_{CORE}}\int_0^{L_{CORE}} q''_{z,max,AV}\cos\left[\frac{2\varepsilon}{L_{CORE}}\left(z-\frac{L_{CORE}}{2}\right)\right]dz = q''_{z,max,AV}\left(\frac{\sin\varepsilon}{\varepsilon}\right) \tag{1.35}$$

Comparing with (1.32), it follows that ε and $P_f$ are related by the equation:

$$P_f = \frac{\varepsilon}{\sin\varepsilon} \tag{1.36}$$

The coolant enthalpy at the center of the nth cell in either a peak or average sub-channel is given by:

$$h_n = h_{i,CORE} + \frac{1}{W_c}\int_0^{z_n} q_z'' \pi d_p dz \quad (1.37)$$

which using (1.31) may be written:

$$h_n = h_{i,CORE} + q''_{z,max}\frac{L_{CORE}\pi d_p}{2\varepsilon W_c}\left\{\sin\left[\frac{2\varepsilon}{L_{CORE}}\left(z_n - \frac{L_{CORE}}{2}\right)\right] + \sin\varepsilon\right\} \quad (1.38)$$

where $$q''_{z,max} = P_f F_{\Delta H} q''_{z,core\ average} \quad \text{PEAK SUBCHANNEL} \quad (1.39)$$

$$q''_{z,max} = P_f q''_{z,core\ average} \quad \text{AVERAGE SUBCHANNEL}$$

Using the enthalpy obtained from (1.38), the local flow quality $X_g$ can be found for conditions when two-phase flow exists in the sub-channel, by using the equation:

$$h_n = X_{g,n} h_{g,Sat,n} + (1 - x_{g,n}) h_{f,Sat,n} \quad (1.40)$$

where $h_{g,Sat}$ and $h_{f,Sat}$ are the saturation enthalpies of the vapour and liquid phases at the local pressure.

Using the flow quality, the coolant density $\rho_{c,n}$ in at the cell center can be determined as follows. The density is first expressed in terms of the local void fraction by the equation [16]:

$$\rho_{c,n} = \alpha_{g,n}\rho_{g,SAT}(P_n) + (1 - \alpha_{g,n})\rho_{f,SAT}(P_n) \quad \alpha_{g,n} > 0 \quad (1.41)$$

$$\rho_{c,n} = \rho_f(P_n, h_n) \quad \alpha_{g,n} = 0$$

where $\alpha_{g,n}$=local void fraction in coolant $\rho_{g,SAT,n}$=density of saturated steam (kg/m$^3$)

$\rho_{f,SAT,n}$=density of saturated or subcooled water (kg/m$^3$)

$P_n$=pressure at centroid of cell n (N/m$^2$)

The void fraction is then found from the flow quality $X_{g,n}$ using a drift flux correlation. For the core 101 analysis, the widely-used drift flux correlation of Zuber and Findlay [17] for churn-turbulent two-phase gas liquid flow in a channel was particularly adopted, which has the form:

$$\alpha_{g,n} = \frac{j_{g,n}}{C_o j_n + V_{gj}} \quad (1.42)$$

where $$j_{g,n} = \text{gas volume flux in cell } n = \frac{W_{g,n}}{\rho_{g,n}A_c} = \frac{X_{g,n}W_c}{\rho_{g,n}A_c}\ \text{(m/s)}$$

$$j_{f,n} = \text{liquid volume flux in cell } n = \frac{W_{f,n}}{\rho_{f,n}A_c} = \frac{(1 - X_{g,n})W_c}{\rho_{f,n}A_c}\ \text{(m/s)}$$

Allowance is made in the core model for the pressure drop in the sub-channel due to wall friction and gravity. The pressure in cell n is calculated from:

$$P_n - P_{n-1} = -\left(\frac{4f\Delta z_c}{D_h}\right)\frac{1}{2}\frac{W_c^2}{\rho_c A_c^2} - \rho_c g(z_n - z_{n-1}) \quad (1.43)$$

where:

$P_n$=Pressure at centroid of cell n (N/m$^2$)

f=Fanning friction factor for subchannel $z_n$=Elevation of centroid of cell n (m)

$\Delta z_c$=Cell length (m)

$D_h$=Subchannel hydraulic diameter=4 $A_c/\pi d_p$

Given $P_n$ the saturation phase densities and enthalpies appearing in (1.40) and (1.41) can be obtained from standard steam tables.

Particularly, equation (1.38) and (1.43) are solved by a marching method (in both the peak and average sub-channel), starting at the core inlet.

Calculation of Fuel Temperature:

To calculate the $UO_2$ and fuel rod cladding temperature in each core cell in the present invention a fuel rod is treated as a cylinder containing a co-centric $UO_2$ fuel pellet. The one-dimensional steady state heat conduction equation in cylindrical coordinates is applied to determine the radial temperature distribution in the pellet and cladding, making the following assumptions:

The outside surface of the cladding is assumed to be at the local coolant temperature in each cell. This is a reasonable assumption for water cooled nuclear reactors due to the high heat transfer coefficients that are obtained in forced convective boiling.

The temperature drop across both the cladding, and the gas gap between the cladding and the fuel pellet, are calculated assuming fixed thermal conductance values for the cladding and gas gap, which are supplied as input data. The values used for the cladding are given in Table 2 above. The value used for the conductance of the gas gap is discussed below.

A uniform volumetric heat source due to nuclear fission and fission product decay is assumed to exist within the fuel pellet. Heat generated in the cladding is ignored.

From the steady state solution of the heat conduction equation in the cylindrical geometry with the above assumptions the radial temperature gradient in the fuel pellet is obtained as $$\frac{dT}{dr} = -\frac{q_{vp} r}{2k_{UO2}} \quad (1.44)$$

where

T=Temperature (K)

r=Radial distance from pellet centre (m)

$q_{vp}$=Volumetric heat source in pellet (W/m$^3$)

$K_{UO2}$=Thermal conductivity of $UO_2$ (W/m K)

The local volumetric heat source in a pellet at height z in the core 101 is related by the local pin surface heat flux given by equation (1.31) by the equation:

$$q_{vp} = \frac{4q_z''}{d_p} \quad (1.45)$$

The thicknesses of the cladding and gas gap are small compared with the fuel rod diameter which allows curvature effects to be ignored in determining the temperature drop between the pellet outer surface and the cladding outer surface. Assuming one-dimensional steady state conduction across the cladding and the gas gap, and using the assumption that the cladding outside temperature is close to the local fluid temperature $T_f$, the temperature at the outside surface of the pellet $T_{po}$ is given by the following equation obtained by equating the heat per unit length flowing into the coolant with the heat per unit length generated in the pellet:

$$\pi d_p\left(\frac{1}{c_{gap}}+\frac{1}{c_{clad}}\right)^{-1}(T_{po}-T_f)=q_{vp}\frac{\pi d_p^2}{4} \tag{1.46}$$

where $c_{clad}$=Conductance of cladding=$k_{clad}/\delta_{clad}$(W/m$^2$K)

$c_{gap}$=Conductance of gas gap=$k_{gap}/\delta_{gap}$(W/m$^2$K)

$q_{vp}$=Volumetric heat source in pellet (W/m$^3$)

$d_p$=Pellet diameter (m)

$T_{po}$=Temperature at pellet outer (K)

$T_f$=Temperature of the fluid (K)

Integrating equation (1.44) between the center and outside surface of the pellet, and using the above equation for $T_{po}$ results in the following equation for the pellet temperature at radial distance r.

$$T(r)-T_f=\frac{q_{vp}d_p}{4c_{clad}}+\frac{q_{vp}d_p}{4c_{gap}}+\frac{q_{vp}}{4k_{UO2}}\left(d_p^2/4-r^2\right) \tag{1.47}$$

From equation (1.47), the mean temperature in the pellet is therefore, $$\overline{T_p}=\frac{4}{\pi d_p^2}\int_0^{d_p/2}2\pi rT(r)dr=T_f+\frac{q_{vp}d_p}{4}\left[\frac{1}{c_{gap}}+\frac{1}{c_{clad}}+\frac{d_p}{8k_{UO2}}\right] \tag{1.48}$$

And the mean temperature in the gas gap is:

$$\overline{T_{gap}}=T_f+\frac{q_{vp}d_p}{4}\left[\frac{1}{2c_{gap}}+\frac{1}{c_{clad}}\right] \tag{1.49}$$

The mean pellet temperature $$\overline{T_p}$$

is calculated for each cell in the average channel, and then the mean $UO_2$ temperature in the core 101 is obtained from:

$$\overline{T_{UO2}}=\frac{1}{N_{cell}}\sum_{j=1}^{N_{cell}}\overline{T_{p,j}} \tag{1.50}$$

where $\overline{T_{p,J}}$ = Pellet mean temperature from equation (1.48) (K)

$N_{cell}$ = Number of core axial cells

Similarly, the mean density of the coolant in the core 101 (i.e. the mean moderator temperature) can be obtained by averaging over all cells in the average sub-channel:

$$\overline{\rho_c}=\frac{1}{N_{cell}}\sum_{j=1}^{N_{cell}}\rho_{c,j} \tag{1.51}$$

where the coolant density in the cell $\rho_{c,j}$ is obtained from (1.41) for the average sub-channels.

Modelling of the Gas Gap Conductance:

The $UO_2$ temperature is affected by the thermal resistance of the gap between the fuel pellet and the cladding which depends principally on the conductivity of the gas inside the fuel pin and the gap width, both of which vary during reactor operation. A review of the methods for determining gap conductions in LWR fuel pins in points out that LWR fuel pins are normally pre-pressurised with helium, which becomes mixed with other gases produced by the fission process during the core 101 life, notably xenon. [19] notes that the thermal conductivity of the filler gas changes significantly with temperature and gas composition, and that the gap width decreases at reactor operating pressures and temperatures due to the external pressure loading on the fuel cladding and the thermal expansion of the fuel pellet. Initially, the gas gap width when the fuel pins are cold is typically 1% to 2% of the pin diameter, but at reactor operating conditions the cladding may come into contact with the fuel pellet so that the gap width is determined by the surface roughness of the fuel pellets.

The LPWR 1 is designed to operate at pressures close to atmospheric and it seems likely that the internal pin pressure in the fuel for such a reactor would be adjusted downward to allow for the reduced pressure loading on the fuel: hence it appears likely that a 'closed gap' condition would continue to exist when the reactor is brought to power due to the thermal expansion of the fuel pellets relative to the cladding. In some embodiments, a fixed value for the gap conductance of $c_{gap}$=1.5×10$^4$ W/m$^2$K has been adopted for the current analysis, which is a typical value for the PWR fuel at normal operating pressures and temperatures when the gap width is small [19]. The mean fuel temperature in the LPWR 1 is expected to be some 200° C. lower than in conventional PWR due to the lower coolant temperatures. Based on equations given in [19], this would be expected to reduce the conductivity of the filler gas by about 20% and the gap conductance by a similar amount, but this correction is neglected as small in comparison with other uncertainties in the model.

Calculation of Departure from Nucleate Boiling Ratio (DNBR):

Critical Heat Flux (CHF) is a key safety limit in the operation of water-cooled reactors. If the local heat flux at the fuel surface exceeds CHF, the heat transfer regime may transition from a nucleate boiling regime to a film boiling regime, resulting in a potentially large reduction in heat transfer coefficient and an increase in cladding temperature that is likely to cause structural failure of the cladding and release of radioactive fission products into the reactor circuit. The margin to CHF in a given reactor state is usually expressed in terms of the minimum value of the Departure from Nucleate Boiling Ratio (DNBR) reached at any point in the core 101, as defined by the equation:

$$DNBR=\frac{q''_{CHF}}{q''} \tag{1.52}$$

The CHF depends on the local thermal hydraulic conditions in a sub-channel, such as the flow quality and mass velocity. Therefore, to find the minimum DNBR associated with a particular core state, the DNBR from (1.52) is evaluated in each core cell in a peak power sub-channel and extract a minimum value.

CHF values in assemblies of fuel pins are specific to the particular fuel geometry and power shape and the presence of flow obstructions such as spacer grids. Therefore, accurate predictions of CHF can only be strictly obtained by performing tests on prototypical models of actual fuel assemblies using electrically heated fuel pin simulators. Nonetheless numerous general-purpose engineering correlations have been developed for estimating CHF values in channels and rod bundles. In the absence of a specific model for the fuel, the widely used correlation of Groeneveld et al for CHF in tubes and rod bundles is used in the LPWR core model to calculate the DNBR. The Groeneveld correlation takes the form of a three-dimensional look-up table in which CHF values are tabulated in terms of the parameters:

$$P = \text{Pressure } (\text{N/m}^2)$$

$$G = \text{Mass velocity } (\text{kg/m}^2\text{/s})$$

$$X = \text{Thermodynamic Quality} = (h - h_{f,sat})/(h_{g,sat} - h_{f,sat})$$

The range of validity of the correlation is given in as P=1 to 200 bars, G=0 to 7500 $kg/m_2/s$ and X=−0.5 to 1.0) which covers the LPWR 1 low-pressure operating conditions.

The look-up tables presented in [20] were copied into a Microsoft Excel spreadsheet file and an Excel function was created which calculated the CHF for given values of P, G and X by linear interpolation from the tables.

It is noteworthy that Groeneveld et al proposed CHF correction factors that could be applied to their tabulated CHF values to correct for the effects of spacer grids, rod bundle geometries etc. etc. but these corrections were not applied in the current analysis.

Data analysis on the CHF table proposed by Groeneveld et al predicted a CHF margin that is higher at lower pressures with other parameters remaining the same. Therefore, it is expected that DNBR values for the LPWR 1 will be significantly higher than for an EPR.

Calculation of Core Reactivity:

The core reactivity defined by equation (1.29) in some embodiments is calculated by the LPWR core model using the reactivity coefficients as previously defined. The reactivity is obtained from the equation:

$$\Delta R = \Delta R_{DOPP} + \Delta R_{MOD} + \Delta R_{BORON} + \Delta R_{RODS} \quad (1.53)$$

where ΔR is the change in reactivity relative to an initial reference state in which the reactor is just critical (R=0, $k_{eff}$=1) and $\Delta R_{DOPP}$, $\Delta R_{MOD}$, $\Delta R_{BORON}$ and $\Delta R_{RODS}$ are the contributions to the reactivity change from changes in fuel temperature, moderator density, boron concentration and control rod position, relative to the reference state. The reactivity contributions in equation (1.53) can be obtained from the following formulae:

$$\Delta R_{DOPP} = \gamma_{DOPP}(\overline{T_{CORE}} - \overline{T_{CORE,o}}) \quad (1.54)$$

$$\Delta R_{MOD} = \gamma_{MOD}(\overline{\rho_{MOD}} - \overline{\rho_{MOD,o}})$$

-continued $$\Delta R_{BORON} = \gamma_{BORON}[C_{CORE}(\overline{\rho_{MOD}}/\overline{\rho_{MOD,o}}) - C_{CORE,o}]$$

$$\Delta R_{RODS} = \text{supplied as input data}$$

where, $\gamma_{MOD}$=moderator density coefficient [pcm/kg $m^3$]

$\gamma_{DOPP}$=Doppler coefficient [pcm/° C.]

$\gamma_{BORON}$=boron coefficient [pcm/ppm]

$\overline{\rho_{MOD}}$=mean moderator density [kg $m^{-3}$]

$\overline{\rho_{MOD,o}}$=mean moderator density in reference state [kg $m^{-3}$]

$\overline{T_{COR}}$=mean $UO_2$ temperature in core [K]

$T_{CORE,o}$=mean $UO_2$ temperature in core in reference state [K]

$C_{CORE}$=boron concentration in liquid in core (ppm)

$C_{CORE,o}$=boron concentration in liquid in core in reference state (ppm)

$\overline{T_{CORE}}$ and $\overline{\rho_{MOD}}$ are calculated by the core model using equations (1.48) and (1.51) respectively, and $C_{CORE}$ is supplied to the model as a boundary condition. The reactivity coefficients used in the LPWR analysis were chosen from table 2, below:

TABLE 2

Reactivity Coefficients Assumed for LPWR Performance & Safety Analysis

| Reactivity Coefficients | Value |
|---|---|
| Doppler Temperature Coefficient (pcm/° C.) | $\gamma_{DOPP}$ = −2.8 pcm/° C. |
| Moderator density Coefficient (pcm/kg $m^{-3}$) | $\gamma_{MOD}$ = +30 (pcm/kg $m^{-3}$) |
| Boron Coefficient (pcm/ppm) | $\gamma_{BORON}$ = −8.6 pcm/ppm |

In a particular embodiment, to calculate the core thermal hydraulic and reactivity conditions, the fluid pressure and enthalpy and the fuel temperatures were obtained for each cell in both the peak and average sub-channels using a marching method, starting at the core inlet. The boundary conditions for the calculation were the core power, the core inlet mass flow rate (particularly, obtained from 1.55, below) and the core inlet enthalpy and pressure.

$$W_{CORE} = 1.4\times10^3 + 1.10\times10^{-5}\dot{Q}_{CORE} - 2.3\times10^{-15}\dot{Q}_{CORE}^2 \qquad \dot{Q}_{CORE} \le 2.2\times10^9 \quad (1.55)$$

$$W_{CORE} = 3.6\times10^4 + 9.97\times10^{-6}\dot{Q}_{CORE} \qquad \dot{Q}_{CORE} > 2.2\times10^9$$

In the above equation, $W_{CORE}$ is the core flow in kg/s and $\dot{Q}_{CORE}$ is the core power in Watts.

Input data for the fuel geometry and thermal properties, and the axial and radial core power distribution, are given in previous Table 1 and in Table 3.

TABLE 3

Peaking factors used for LPWR Design Study

| Thermal Peaking Factor | Value |
|---|---|
| Nuclear enthalpy rise hot channel factor $F_{\Delta H}$ | 1.7 |

TABLE 3-continued

| Peaking factors used for LPWR Design Study | |
|---|---|
| Thermal Peaking Factor | Value |
| Total heat flux hot channel factor $F_Q^{max}$ | 2.6 |
| Mean axial peaking factor $P_F = F_Q^{max}/F_{\Delta H}$ | 1.5 |

The numerical calculations were carried out in a Microsoft Excel spreadsheet. In all calculations the core 101 was divided axially into 20 subdivisions (Ncell=20).

The scope of the present invention is defined in the following set of claims.

REFERENCES

[1] World Energy Outlook 2013, International Energy Agency, Table 5.1.

[2] Balatsky A. V., Balatsky, G. I., Borysov S. S., "Resource Demand Growth and Sustainability Due to Increased World Consumption", Sustainability, ISSN 2071-1050 March 2015.

[3] Sehgal, Bal Raj. "Nuclear Safety in Light Water Reactors: Severe Accident Phenomenology", SARnet, Elsevier, 2012

[4] Nuclear Energy Agency, "Nuclear Fuel Behaviour in Loss-of-coolant Accident (LOCA) Conditions", State-of-the-art Report, OECD-NEA, ISBN 978-92-64-99091-3, 2009.

[5] Kessides, I N, The future of the nuclear industry reconsidered, Risks, Uncertainties and Continued Premise, Energy Policy, Elsevier May 2012.

[6]. Innovative small and medium sized reactors: Design features, safety approaches and R&D trends, IAEA-TECDONC-1451 May 2005, International Atomic Energy Agency.

[7] Sovacool B K, Nugent D, Gilbert A, Construction Cost Overruns and Electricity Infrastructure: An Unavoidable Risk? The Electricity Journal, 2014.

[8] Lovering J R, Yip A, Nordhaus E, Historical construction costs of global nuclear power reactors, Energy Policy, 91, 2016

[9] Phung D., "Economics of nuclear power: past record, present trends and future prospects", Elsevier, Energy, Vol. 10 Issue 8, pp. 917-934, August 1985.

[10] Rust J., Rothwell G., "Optimal response to a shift in regulatory regimes: the case of the US nuclear power industry", Journal of Applied Econometrics, Wiley, December 1995.

[11] Grubler, A, The costs of the French nuclear scale-up: A case of negative learning by doing, Energy Policy, 38, 2010.

[12] Innovative small and medium sized reactors: Design features, safety approaches and R&D trends, IAEA-TECDONC-1451 May 2005, International Atomic Energy Agency.

[13] National Nuclear Laboratory, "Small Modular Reactors (SMR) Feasibility Study", December 2014.

[14] Spring N., 2010 PennEnergy, The mPower Modular Reactor.

[15] U.S. Nuclear Regulatory Commission Design-Specific Review Standard (DSRS) for the BWXT mPower Design, https://www.nrc.gov/reactors/new-reactors/smr/mpower/dsrs.html

[16] Wallis, G. B., One Dimensional Two-Phase Flow, McGraw Hill Book Company, New York, 1969.

[17] N. Zuber, and J. A. Findlay, Average Volumetric Concentration in Two-Phase Flow Systems, Trans ASME J. Heat Transfer, November 1965.

[18] H. S. Carslaw, J. C. Jaeger, Conduction of Heat in Solids, second ed., Oxford University Press, Oxford, 1959.

[19] J. B. Ainscough, Gap Conductance in Zircalloy Clad Fuel Rods, CSNI Report No. 72, April 1982

[20] D. C. Groeneveld, J. Q. Shan, A. Z. Vasic, L. K. H. Leung, A. Durmayaz, J. Yang, S. C. Cheng and A. Tanase, The 2006 CHF look-up table, Nuclear Engineering and Design, Vol 237 Issues 15-17, Pages 1909-1922 September 2007.

The invention claimed is:

1. A nuclear reactor, comprising:

a reactor vessel having therein an internal cavity comprising primary coolant, including water, a riser tube, and a reactor core located below the riser tube, an outer annulus surrounding the reactor vessel and the riser tube forming a downcomer with a given flow area and configured to produce a primary coolant flow rate above 10,000 kg/s with a pressure within a range of 6 and 15 bars, the reactor core being located below ground level at, at least, 55 meters depth;

a steam drum connected to the riser tube via an upper end of the riser tube, the steam drum being located at ground level with a pressure within a range between 1 and 10 bars;

a water storage tank connected to the reactor vessel and configured to store borated water;

a passive injection system configured to cause borated water from the water storage tank to be injected into the reactor vessel;

one or more steam turbines configured to generate power at a pressure of 1-10 bars;

the reactor core is configured to heat water up to a certain temperature, without reaching a saturation point, and the riser tube is configured to convert the heated water to steam, the steam drum is configured to deliver the steam to the one or more steam turbines, whereby the conversion creates a difference in a primary coolant density that achieves a density-driven natural circulation of the primary coolant in the riser tube, the downcomer, the steam drum, and the reactor core.

2. The nuclear reactor of claim 1, wherein the steam is generated by means of flashing in the riser tube.

3. The nuclear reactor of claim 1 wherein the steam drum comprises one or more driers, a top hatch and a splash plate, and is located within a watertight room.

4. The nuclear reactor of claim 1 wherein the downcomer comprises a steel-lined concrete shaft.

5. The nuclear reactor of claim 1 wherein the water storage tank is connected to the reactor vessel via passive valves.

6. The nuclear reactor of claim 1 wherein the nuclear reactor is configured to be shutdown either by means of shutdown rods or by means of injecting borated water from the water storage tank.

7. The nuclear reactor of claim 1 wherein the borated water stored in the water storage tank comprises at least 1000 parts per million of boron concentration, with height of borated water level above 20 m.

8. A method for controlling a nuclear reactor, the nuclear reactor comprising:

a reactor vessel having therein an internal cavity comprising primary coolant, including water, a riser tube, and a reactor core located below the riser tube, an outer annulus surrounding the reactor vessel and the riser tube forming a downcomer with a given flow area and configured to produce a primary coolant flow rate above 10,000 kg/s with a pressure within a range of 6 and 15 bars, the reactor core being located below ground level at, at least, 55 meters depth;

a steam drum connected to the riser tube via an upper end of the riser tube, the steam drum being located at ground level with a pressure within a range between 1 and 10 bars;

a water storage tank connected to the reactor vessel and storing borated water;

a passive injection system configured to cause the borated water from the water storage tank to be injected into the reactor vessel;

one or more steam turbines configured to generate power at a pressure of 1-10 bars, wherein the method comprises heating, by the reactor core, water up to a certain temperature, without reaching a saturation point, and converting, by the riser tube, the heated water to steam, and delivering the steam to the one or more steam turbines via the steam drum, whereby the converting step creates a difference in a primary coolant density that achieves a density-driven natural circulation of the primary coolant in the riser tube, the downcomer, the steam drum, and the reactor core.

9. The method of claim 8, wherein a core inlet temperature is between 100° C. and 150° C., a core outlet temperature is between 140° ° C. and 170° C., and a core inlet resistance dampens static instability, and wherein a steam drum steam outlet temperature is between 100° C. and 170° C.

10. The method of claim 8, further comprising generating the steam by means of flashing in the riser tube (104).

11. The method of claim 8, wherein the borated water stored in the water storage tank (200) comprises at least 1000 parts per million of boron concentration, with height of borated water level above 20 m.

12. The method of claim 8, wherein the water storage tank is connected to the reactor vessel via valves, the method further comprising controlling and/or shutting down the valves responsive to a given boron concentration in the primary coolant being reached.

13. The method of claim 8, wherein the reactor core operates with single phase primary coolant during a steady-state operation of the nuclear reactor while producing the steam with the primary coolant.

* * * * *